(12) United States Patent
Nahas et al.

(10) Patent No.: US 9,126,870 B2
(45) Date of Patent: Sep. 8, 2015

(54) COLORED SINTERED ZIRCONIA

(75) Inventors: Nabil Nahas, Serris (FR); Daniel Urffer, Saint Saturnin les Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 769 days.

(21) Appl. No.: 13/380,118

(22) PCT Filed: Jun. 29, 2010

(86) PCT No.: PCT/IB2010/052952
§ 371 (c)(1),
(2), (4) Date: Jan. 26, 2012

(87) PCT Pub. No.: WO2011/001368
PCT Pub. Date: Jan. 6, 2011

(65) Prior Publication Data
US 2012/0121859 A1    May 17, 2012

(30) Foreign Application Priority Data
Jun. 30, 2009 (FR) ................................ 09 54475

(51) Int. Cl.
| | |
|---|---|
| *C04B 35/48* | (2006.01) |
| *C04B 35/49* | (2006.01) |
| *C04B 35/486* | (2006.01) |
| *C04B 35/488* | (2006.01) |
| *C04B 35/626* | (2006.01) |

(52) U.S. Cl.
CPC ............. *C04B 35/486* (2013.01); *C04B 35/488* (2013.01); *C04B 35/6261* (2013.01); *C04B 2235/3206* (2013.01); *C04B 2235/326* (2013.01); *C04B 2235/327* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3229* (2013.01); *C04B 2235/3232* (2013.01); *C04B 2235/3239* (2013.01); *C04B 2235/3241* (2013.01); *C04B 2235/3243* (2013.01); *C04B 2235/3251* (2013.01); *C04B 2235/3256* (2013.01); *C04B 2235/3258* (2013.01); *C04B 2235/3262* (2013.01); *C04B 2235/3268* (2013.01); *C04B 2235/3272* (2013.01); *C04B 2235/3274* (2013.01); *C04B 2235/3275* (2013.01); *C04B 2235/3279* (2013.01); *C04B 2235/3281* (2013.01); *C04B 2235/3284* (2013.01); *C04B 2235/3298* (2013.01); *C04B 2235/5445* (2013.01); *C04B 2235/6562* (2013.01); *C04B 2235/768* (2013.01); *C04B 2235/77* (2013.01); *C04B 2235/96* (2013.01); *C04B 2235/963* (2013.01); *C04B 2235/9661* (2013.01); *Y10T 428/24413* (2015.01)

(58) Field of Classification Search
CPC ...... C04B 35/48; C04B 35/482; C04B 35/488
USPC .................................................. 501/103, 104
See application file for complete search history.

(56) References Cited

U.S. PATENT DOCUMENTS

| | | | | |
|---|---|---|---|---|
| 4,465,778 | A * | 8/1984 | Brook et al. | 501/104 |
| 4,596,750 | A * | 6/1986 | Ruka et al. | 429/508 |
| 5,854,157 | A * | 12/1998 | Hwang et al. | 501/104 |
| 6,136,232 | A * | 10/2000 | Burlingame | 252/521.1 |
| 2003/0027033 | A1 | 2/2003 | Seabaugh et al. | |
| 2007/0270304 | A1 | 11/2007 | Fujisaki | |

FOREIGN PATENT DOCUMENTS

| | | |
|---|---|---|
| EP | 0 678 490 A1 | 10/1995 |
| JP | A-2005-289721 | 10/2005 |
| JP | A-2006-342036 | 12/2006 |
| WO | WO 02/081402 A2 | 10/2002 |

OTHER PUBLICATIONS

Sun et al., "Synthesis and Electrochemical Characterization of Pure and Composite Cathode Materials for Solid Oxide Fuel Cells," Journal of New Materials for Electrochemical Systems, 2004, pp. 247-255, vol. 7.
Brunauer et al., "Adsorption of Gases in Multimolecular Layers," Journal of American Chemical Society, 1938, pp. 309-319, vol. 60.
Mendelson, "Average Grain Size in Polycrystalline Ceramics," Journal of the American Ceramic Society, Aug. 1969, pp. 443-446, vol. 52—No. 8.
French Search Report dated Dec. 11, 2009 issued in French Patent Application No. 0954475 (with translation).
French Written Opinion dated Dec. 11, 2009 issued in French Patent Application No. 0954475 (with translation).
International Search Report mailed Aug. 30, 2010 issued in International Patent Application No. PCT/IB32010/052952 (with translation).
Written Opinion of the International Searching Authority mailed Aug. 30, 2010 issued in International Patent Application No. PCT/IB2010/052952 (with translation).

* cited by examiner

*Primary Examiner* — Noah Wiese
(74) *Attorney, Agent, or Firm* — Oliff PLC

(57) ABSTRACT

An article with a sintered decorative part obtained from a particulate mixture having the following chemical composition:
- zirconia $ZrO_2$: complement to 100%;
- 0.5% to 10.0% of oxide(s) with a perovskite structure;
- 2.0% to 20.0% of a stabilizer for zirconia selected from $Y_2O_3$, $Sc_2O_3$, MgO, CaO, $CeO_2$, and mixtures thereof, the quantity MgO+CaO being less than 5.0%;
- less than 2.0% of a sintering additive selected from $Al_2O_3$, ZnO, $TiO_2$, and mixtures thereof; and
- less than 2.0% of other oxides.

36 Claims, No Drawings

COLORED SINTERED ZIRCONIA

TECHNICAL FIELD

The invention relates to a particulate mixture, to a sintered part obtained from such a particulate mixture, and to a method of manufacturing said sintered part.

PRIOR ART

Sintered parts based on zirconia are routinely used for the manufacture of decorative articles such as jewelry, watches, bracelets, brooches, tie-pins, necklaces, purses, telephones, furniture, or household utensils.

In order to obtain a color, a pigment may be added to the zirconia. As an example, US 2007/270304 describes a zirconia article incorporating a pigment having a spinel structure based on cobalt, zinc, iron, and aluminum. JP 2006-342036, JP 2005-289721 or EP 0 678 490 supply further examples of pigments.

However, the pigment generally tends to be degraded during sintering of the zirconia, which may result in a modification of the color that is difficult to control.

The zirconia of decorative articles must also have good scratch and shock resistance and look good, with well developed, homogeneous colors. It must also be biocompatible, i.e. not contain elements that may be leached out and that could be dangerous to man.

There is a continuing need for novel ceramic sintered parts based on zirconia that have such properties and for novel methods of manufacturing said parts.

An aim of the invention is to satisfy this need, at least in part.

SUMMARY OF THE INVENTION

In accordance with the invention, this aim is achieved by means of a particulate mixture having the following chemical composition, as percentages by weight based on the oxides:
  zirconia $ZrO_2$: complement to 100%;
  0.5% to 10.0% of oxide(s) with a perovskite structure;
  2.0% to 20.0% of a stabilizer for zirconia selected from the group consisting of $Y_2O_3$, $SO_2O_3$, MgO, CaO, $CeO_2$, and mixtures thereof, the quantity MgO+CaO being less than 5.0%;
  less than 2.0% of a sintering additive selected from the group consisting of $Al_2O_3$, ZnO, $TiO_2$, and mixtures thereof;
  less than 2.0% of other oxides; the oxide(s) with a perovskite structure and/or said stabilizer and/or said sintering additive possibly being replaced, completely or in part, by an equivalent quantity of precursor(s) of said oxides.

Preferably, the particulate mixture comprises 0.5% to 10.0% of oxide(s) with a perovskite structure.

The inventors have observed that a particulate mixture in accordance with the invention can be used to manufacture, by sintering, a zirconia that is ideally suited to the manufacture of decorative articles.

A particulate mixture in accordance with the invention may also comprise one or more of the following optional characteristics:
  The A-element at the A-site of the perovskite structure is selected from the group $G_A(1)$ consisting of calcium Ca, strontium Sr, barium Ba, lanthanum La, praseodymium. Pr, neodymium Nd, bismuth Bi, cerium Ce, and mixtures thereof.
  Preferably, A is selected from the group $G_A(2)$ consisting of a mixture of calcium and lanthanum, a mixture of strontium and lanthanum, calcium, strontium, barium, lanthanum, praseodymium, neodymium, bismuth, cerium, and mixtures thereof.
  Preferably, A is selected from the group $G_A(3)$ consisting of lanthanum, praseodymium, bismuth, cerium, neodymium, and mixtures thereof.
  Preferably, A is lanthanum.
  The B-element at the B-site of the perovskite structure is selected from the group $G_B(1)$ consisting of a mixture of cobalt and iron, a mixture of cobalt and manganese, a mixture of cobalt and chromium, a mixture of cobalt and nickel, a mixture of chromium and manganese, a mixture of chromium and nickel, a mixture of chromium and iron, a mixture of manganese and iron, a mixture of manganese and nickel, a mixture of nickel and iron, manganese, a mixture of cobalt and titanium, a mixture of cobalt and copper, cobalt, a mixture of chromium and titanium, a mixture of chromium and copper, a mixture of nickel and titanium, chromium, nickel, copper, a mixture of magnesium and iron, a mixture of titanium and iron, vanadium, tungsten, molybdenum, a mixture of niobium and iron, iron, and mixtures thereof.
  Preferably, B is selected from the group $G_B(2)$ consisting of a mixture of cobalt and iron, a mixture of cobalt and manganese, a mixture of chromium and manganese, a mixture of chromium and iron, a mixture of manganese and iron, a mixture of cobalt and chromium and iron, a mixture of cobalt and chromium and iron and manganese, a mixture of cobalt and iron and manganese, manganese, a mixture of cobalt and chromium, a mixture of cobalt and nickel, a mixture of cobalt and titanium, a mixture of cobalt and copper, cobalt, a mixture of chromium and nickel, a mixture of chromium and titanium, a mixture of chromium and copper, a mixture of nickel and iron, a mixture of nickel and manganese, a mixture of nickel and cobalt, a mixture of nickel and titanium, a mixture of nickel and cobalt and chromium, a mixture of nickel and cobalt and chromium and manganese, a mixture of nickel and chromium and manganese, chromium, nickel, copper, a mixture of titanium and iron, vanadium, tungsten, molybdenum, a mixture of magnesium and iron a mixture of niobium and iron, iron, and a mixture of chromium and manganese and iron.
  Preferably, B is selected from the group $G_B(3)$ consisting of a mixture of cobalt and chromium and iron, a mixture of cobalt and chromium and iron and manganese, a mixture of cobalt and iron and manganese, manganese, a mixture of cobalt and chromium, cobalt, a mixture of chromium and nickel, a mixture of nickel and cobalt, a mixture of nickel and cobalt and chromium, a mixture of nickel and cobalt and chromium and manganese, chromium, nickel, a mixture of magnesium and iron, a mixture of titanium and iron, iron, a mixture of chromium and iron, a mixture of manganese and iron, and a mixture of chromium and manganese and iron.
  The quantity of perovskite in the "0.5% to 10% of oxide(s) with a perovskite structure and/or of precursor(s) of said oxides" is greater than 90%, preferably greater than 95%, preferably greater than 99%, preferably substantially 100%
  In general, in order to make the color darker, the quantity of oxide(s) with a perovskite structure and/or of precursor(s) of said oxides is preferably greater than 3%, preferably greater than 4% and/or preferably less than 9%, preferably less than 6%. In contrast, in general, in order to lighten the color, the quantity of oxide(s) with a perovskite structure and/or of precursor(s) of said oxides is preferably less than 3%, preferably less than 2%, more preferably less than 1.5%.

The total quantity of zirconia+any stabilizer is greater than 80%, greater than 90%, or even greater than 95%

The stabilizer for zirconia is selected from the group consisting of $Y_2O_3$, $Sc_2O_3$, and mixtures thereof and the quantity of said stabilizer for zirconia is less than 8%, preferably less than 6.5%.

The stabilizer for zirconia is selected from the group consisting of MgO, CaO, and mixtures thereof, and the quantity of said stabilizer for zirconia is less than 4%.

The stabilizer for zirconia is $CeO_2$ and the quantity of said stabilizer for zirconia is greater than 10% and less than 15%.

The stabilizer for zirconia is selected from the group consisting of $Y_2O_3$, $CeO_2$, and mixtures thereof, and preferably satisfies the relationship $10\% \leq 3.Y_2O_3 + CeO_2 \leq 20\%$.

The stabilizer is $Y_2O_3$, i.e. the particulate mixture comprises only $Y_2O_3$ as the stabilizer.

The quantity of $Y_2O_3$ is greater than 3%, preferably greater than 4%, and/or less than 8.15 preferably less than 6.5%.

The particulate mixture comprises zirconia stabilized with said stabilizer, or a mixture of zirconia particles, which may optionally be stabilized, and particles of said stabilizer, or a mixture of particles in which the zirconia, which may optionally be stabilized, and said stabilizer are intimately mixed. Such an intimate mixture may, for example, be obtained by co-precipitation or spray atomization, optionally consolidated by a heat, treatment. In said mixtures, the stabilizer may be replaced by an equivalent quantity of precursor(s) of said stabilizer.

In a preferred embodiment, the particulate mixture comprises particles in which the zirconia, which may optionally be stabilized, stabilizer and/or the sintering additive are intimately mixed. Preferably, the particulate mixture comprises particles in which the zirconia, which may optionally be stabilized, the stabilizer and the sintering additive are intimately mixed.

The quantity of sintering additive is greater than 0.1%, preferably greater than 0.2% and/or less than 1.5%, preferably less than 1%, preferably less than 0.5%.

The sintering additive is $Al_2O_3$ or a precursor of $Al_2O_3$, preferably, the sintering additive is $Al_2O_3$.

The particulate mixture does not include a precursor for the stabilizer and/or the sintering additive.

The particulate mixture has a median size of less than 10 μm [micrometer], or even less than 5 μm, or even less than 3 μm, or even less than 1 μm and/or preferably greater than 0.05 μm. The median size of the particulate mixture is suitable for the shaping method used to manufacture the sintered part.

The powder constituted by particles of oxide(s) with a perovskite structure and/or of precursor(s) of said oxides has a median size of less than 5 μm, preferably less than 1 μm, preferably less than 0.5 μm.

When the color black or gray is sought for the sintered part to be manufactured, A and B may be selected as follows:

A may be selected from the group $G_A'(1)$ consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A'(2)$ consisting of a mixture of calcium and lanthanum, a mixture of strontium and lanthanum, lanthanum, and mixtures thereof.

More preferably, A is selected from the group $G_A'(3)$ consisting of lanthanum.

B may be selected from the group $G_B'(1)$ consisting of a mixture of cobalt and iron. $Co_x Fe_{1-x}$, with x in the range 0.2 to 0.8, a mixture of cobalt and manganese $Co_x Mn_{1-x}$, with x in the range 0.2 to 0.8, a mixture of cobalt and chromium $Co_x Cr_{1-x}$, with x in the range 0.2 to 0.8, a mixture of cobalt and nickel $Co_x Ni_{1-x}$, with x in the range 0.3 to 0.8, a mixture of chromium and manganese $Cr_x Mn_{1-x}$, with x in the range 0.2 to 0.7, a mixture of chromium and nickel $Cr_x Ni_{1-x}$, with x in the range 0.3 to 0.7, a mixture of chromium and iron $Cr_x Fe_{1-x}$ in the range 0.3 to 0.7, a mixture of manganese and iron $Mn_x Fe_{1-x}$, with x in the range 0.3 to 0.8, a mixture of manganese and nickel $Mn_x Ni_{1-x}$, with x in the range 0.3 to 0.8, a mixture of nickel and iron $Ni_x Fe_{1-x}$ with x in the range 0.3 to 0.7, manganese, and mixtures thereof.

Preferably, B is selected from the group $G_B'(2)$ consisting of a mixture of cobalt and iron $Co_x Fe_{1-x}$, with x in the range 0.4 to 0.7, a mixture of cobalt and manganese $Co_x Mn_{1-x}$, with x in the range 0.4 to 0.6, a mixture of chromium and manganese $Cr_x Mn_{1-x}$, with x in the range 0.3 to 0.6, a mixture of chromium and iron $Cr_x Fe_{1-x}$, with x in the range 0.4 to 0.6, a mixture of manganese and iron $Mn_x Fe_{1-x}$, with x in the range 0.4 to 0.6, a mixture of cobalt and chromium and iron $Co_x Cr_y Fe_z Mn_t$, with x in the range 0.2 to 0.4, y in the range 0.2 to 0.4 and z in the range 0.2 to 0.4 and x+y+z=1, a mixture of cobalt and chromium and iron and manganese $Co_x Cr_y Fe_z Mn_t$, with x in the range 0.1 to 0.4, y in the range 0.1 to 0.4, z in the range 0.1 to 0.4 and t in the range 0.1 to 0.4 and x+y+z+t=1, a mixture of cobalt and iron and manganese $Co_x Fe_y Mn_z$, with x in the range 0.2 to 0.4, y in the range 0.3 to 0.5 and z in the range 0.2, to 0.4 and x+y+z=1, and manganese.

More preferably, B is selected from the group $G_B'(3)$ consisting of a mixture of cobalt and chromium and iron $Co_x Cr_y Fe_z$, with x in the range 0.2 to 0.4, y in the range 0.2 to 0.4 and z in the range 0.2 to 0.4 and x+y+z=1, a mixture of cobalt and chromium and iron and manganese $Co_x Cr_y Fe_x Mn_t$, with x in the range 0.1 to 0.4, y in the range 0.1 to 0.4, z in the range 0.1 to 0.4 and t in the range 0.1 to 0.4 and x+y+z+t=1, a mixture of cobalt and iron and manganese $Co_x Fe_y Mn_z$, with x in the range 0.2 to 0.4, y in the range 0.3 to 0.5 and z in the range 0.2 to 0.4 and x+y+z=1, and manganese.

(R1): When the color black is sought for the sintered part to be manufactured, a particulate mixture in accordance with the invention may in particular comprise a quantity of powder of oxide(s) with a perovskite structure and/or of precursor(s) of said oxides that is greater than 3%, preferably greater than 4%, preferably greater than 5%, and/or less than 6%, A and B preferably being selected from the groups $G_A'$ and $G_B'$ (1) to (3) above. In particular, when the color black is sought, a particulate mixture in accordance with the invention may comprise a quantity of a powder of oxide(s) with a perovskite structure and/or of precursor(s) of said oxides that is:

greater than 5% and preferably less than 6% when the B-element is $Co_x Fe_{1-x}$, with x in the range 0.2 to 0.3 or x in the range 0.7 to 0.8;

greater than 4% and preferably less than 6% when the B-element is $Co_x Fe_{1-x}$, with x in the range 0.3 to 0.4 or x in the range 0.6 to 0.7;

greater than 3% and preferably less than 6% when the B-element is $Co_x Fe_{1-x}$, with x in the range 0.4 to 0.6;

greater than 3% and preferably less than 6% when the B-element is $Co_x Mn_{1-x}$, with x in the range 0.2 to 0.6;

greater than 4% and preferably less than 6% when the B-element is $Co_x Mn_{1-x}$, with x in the range 0.6 to 0.7;

greater than 5% and preferably less than 6% when the B-element is $Co_x Mn_{1-x}$, with x in the range 0.7 to 0.8;

greater than 5% and preferably less than 6% when the B-element is $Co_x Cr_{1-x}$, with x in the range 0.2 to 0.3 or x in the range 0.7 to 0.8;

greater than 4% and preferably less than 6% when the B-element is $Co_x Cr_{1-x}$, with x in the range 0.3 to 0.4 or x in the range 0.6 to 0.7;

greater than 3% and preferably less than 6% when the B-element is $Co_x Cr_{1-x}$, with x in the range 0.4 to 0.6;

greater than 5% and preferably less than 6% when the B-element is $Co_x Ni_{1-x}$, with x in the range 0.2 to 0.3 or x in the range 0.7 to 0.8;

greater than 4% and preferably less than 6% when the B-element is $Co_x Ni_{1-x}$, with x in the range 0.3 to 0.4 or x in the range 0.6 to 0.7;

greater than 3% and preferably less than 6% when the B-element is $Co_x Ni_{1-x}$, with x in the range 0.4 to 0.6;

greater than 3% and preferably less than 6% when the B-element is $Cr_x Mn_{1-x}$, with x in the range 0.2 to 0.6;

greater than 4% and preferably less than 6% when the B-element is $Cr_x Mn_{1-x}$, with x in the range 0.6 to 0.7;

greater than 4% and preferably less than 6% when the B-element is $Cr_x Ni_{1-x}$, with x in the range 0.3 to 0.4 or x in the range 0.6 to 0.7;

greater than 3% and preferably less than 6% when the B-element is $Cr_x Ni_{1-x}$, with x in the range 0.4 to 0.6;

greater than 4% and preferably less than 6% when the B-element is $Cr_x Fe_{1-x}$, with x in the range 0.3 to 0.4 or x in the range 0.6 to 0.7;

greater than 3% and preferably less than 6% when the B-element is $Cr_x Fe_{1-x}$, with x in the range 0.4 to 0.6;

greater than 4% and preferably less than 6% when the B-element is $Mn_x Fe_{1-x}$, with x in the range 0.3 to 0.4;

greater than 3% and preferably less than 6% when the B-element is $Mn_x Fe_{1-x}$, with x in the range 0.4 to 0.8;

greater than 4% and preferably less than 6% when the B-element is $Mn_x Ni_{1-x}$, with x in the range 0.3 to 0.4;

greater than 3% and preferably less than 6% when the B-element is $Mn_x Ni_{1-x}$, with x in the range 0.4 to 0.8;

greater than 4% and preferably less than 6% when the B-element is $Ni_x Fe_{1-x}$, with x in the range 0.3 to 0.4 or x in the range 0.6 to 0.7;

greater than 3% and preferably less than 6% when the B-element is $Ni_x Fe_{1-x}$, with x in the range 0.4 to 0.6.

(R2): When a gray color is sought for the sintered part to be manufactured, a particulate mixture in accordance with the invention may in particular comprise a quantity of powder of oxide(s) with a perovskite structure and/or of precursor(s) of said oxides of less than 3%, preferably less than 2%, or even less than 1.5%, A and B preferably being selected from the groups $G_A'$ and $G_B'$ (1) to (3) above.

(R3): When the color blue is sought for the sintered part to be manufactured, A and B may be selected as follows:

A may be selected from the group $G_A''(1)$ consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A''(2)$ consisting of a mixture of calcium and lanthanum, a mixture of strontium and lanthanum, lanthanum, and mixtures thereof.

More preferably, A is selected from the group $G_A''(3)$ consisting of lanthanum.

B may be selected from the group $G_B''(1)$ consisting of a mixture of cobalt and iron $Co_x Fe_{1-x}$, with $0.6 \le x<1$, a mixture of cobalt and manganese $Co_x Mn_{1-x}$, with $0.6 \le x<1$, a mixture of cobalt and chromium $Co_x Cr_{1-x}$, with $0.6 \le x<1$, a mixture of cobalt and nickel $Co_x Ni_{1-x}$, with $0.6 \le x<1$, a mixture of cobalt and titanium $Co_x Ti_{1-x}$, with $0.5 \le x<1$, a mixture of cobalt and copper. $Co_x Cu_{1-x}$, with $0.5 \le x<1$, cobalt, and mixtures thereof.

Preferably, B is selected from the group $G_B''(2)$ consisting of a mixture of cobalt and iron $Co_x Fe_{1-x}$ with $0.8 \le x<1$, a mixture of cobalt and manganese $Co_x Mn_{1-x}$, with $0.8 \le x<1$, a mixture of cobalt and chromium $Co_x Cr_{1-x}$, with $0.8 \le x<1$, a mixture of cobalt and nickel $Co_x Ni_{1-x}$, with $0.8 \le x<1$, a mixture of cobalt and titanium $Co_x Ti_{1-x}$, with $0.8 \le x<1$, a mixture of cobalt and copper $Co_x Cu_{1-x}$, with $0.8 \le x<1$, a mixture of cobalt and chromium and iron $Co_x Cr_y Fe_z$, with x in the range 0.5 to 0.8, y in the range 0.1 to 0.4 and z in the range 0.1 to 0.4 and $x+y+z=1$, a mixture of cobalt and chromium and iron and manganese $Co_x Cr_y Fe_z Mn_t$, with x in the range 0.5 to 0.7, y in the range 0.1 to 0.3, z in the range 0.1 to 0.3 and t in the range 0.1 to 0.3 and $x+y+z+t=1$, a mixture of cobalt and iron and manganese $Co_x Fe_y Mn_z$, with x in the range 0.5 to 0.8, y in the range 0.1 to 0.4 and z in the range 0.1 to 0.4 and $x+y+z=1$, and cobalt.

More preferably, B is selected from the group $G_B''(3)$ consisting of a mixture of cobalt and chromium $Co_x Cr_{1-x}$, with $0.8 \le x<1$, a mixture of cobalt and chromium and iron $Co_x Cr_y Fe_z$, with x in the range 0.7 to 0.8, y in the range 0.1 to 0.2 and z in the range 0.1 to 0.2 and $x+y+z=1$, a mixture of cobalt and chromium and iron and manganese $Co_x Cr_y Fe_z Mn_t$, with x in the range 0.5 to 0.7, y in the range 0.1 to 0.3, z in the range 0.1 to 0.3 and t in the range 0.1 to 0.3 and $x+y+z+t=1$, a mixture of cobalt and iron and manganese $Co_x Fe_y Mn_z$, with x in the range 0.7 to 0.8, y in the range 0.1 to 0.2 and z in the range 0.1 to 0.2 and $x+y+z=1$, and cobalt.

(R4): When the color dark blue is sought for the sintered part to be manufactured, a particulate mixture in accordance with the invention, may in particular comprise a quantity of powder of oxide(s) with a perovskite structure and/or of precursor(s) of said oxides that is greater than 3%, preferably greater than 4%, preferably greater than 5% and/or less than 6%, A and B preferably being selected from the groups $G_A''$ and $G_B''$ (1) to (3) above. In particular, a particulate mixture in accordance with the invention may comprise a quantity of a powder of oxide(s) with a perovskite structure and/or of precursor(s) of said oxides that is:

greater than 3% and less than 5% when the B-element is $Co_x Fe_{1-x}$, with x in the range 0.7 to 0.8;

greater than 3% and less than 4% when the B-element is $Co_x Fe_{1-x}$, with x in the range 0.6 to 0.7;

greater than 3% and preferably less than 6% when the B-element is $Co_x Fe_{1-x}$, with $0.8 \le x<1$;

greater than 3% and less than 5% when the B-element is $Co_x Mn_{1-x}$, with x in the range 0.7 to 0.8;

greater than 3% and less than 4% when the B-element is $Co_x Mn_{1-x}$, with x in the range 0.6 to 0.7;

greater than 3% and preferably less than 6% when the B-element is $Co_x Mn_{1-x}$, with $0.8 \le x<1$;

greater than 3% and less than 5% when the B-element is $Co_x Cr_{1-x}$, with x in the range 0.7 to 0.8;

greater than 3% and less than 4% when the B-element is $Co_x Cr_{1-x}$, with x in the range 0.6 to 0.7;

greater than 3% and preferably less than 6% when the B-element is $Co_x Cr_{1-x}$, with $0.8 \le x<1$;

greater than 3% and less than 5% when the B-element is $Co_x Ni_{1-x}$, with x in the range 0.7 to 0.8;

greater than 3% and less than 4% when the B-element is $Co_x Ni_{1-x}$, with x in the range 0.6 to 0.7;

greater than 3% and preferably less than 6% when the B-element is $Co_x Ni_{1-x}$, with $0.8 \le x<1$.

(R5): When the color light blue is sought for the sintered part to be manufactured, a particulate mixture in accordance with the invention may in particular comprise a quantity of powder of oxide(s) with a perovskite structure and/or of precursor(s) of said oxides that is less than 3%, preferably less than 2%, preferably less than 1.5%, A and B preferably being selected from the groups $G_A''$ and $G_B''$ (1) to (3) above.

(R6): When the color green is sought for the sintered part to be manufactured, A and B may be selected as follows:

A may be selected from the group $G_A''$ (1) consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A'''$ (2) consisting of a mixture of calcium and lanthanum, a mixture of strontium, and lanthanum, lanthanum, and mixtures thereof.

More, preferably, A is selected from the group $G_A'''$ (3) consisting of lanthanum.

B may be selected from the group $G_B'''$ (1) consisting of a mixture of chromium and iron $Cr_x Fe_{1-x}$, with $0.6 \leq x < 1$, a mixture of chromium and manganese $Cr_x Mn_{1-x}$, with $0.6 \leq x < 1$, a mixture of chromium and cobalt $Cr_x Co_{1-x}$, with $0.6 \leq x < 1$, a mixture of chromium and nickel $Cr_x$ with $0.6 \leq x < 1$, a mixture of chromium and titanium $Cr_x Ti_{1-x}$, with $0.5 \leq x < 1$, a mixture, of chromium and copper $Cr_x Cu_{1-x}$, with $0.5 \leq x < 1$, a mixture of nickel and iron $Ni_x Fe_{1-x}$, with $0.6 \leq x < 1$, a mixture of nickel and manganese $Ni_x Mn_{1-x}$, with $0.6 \leq x < 1$, a mixture of nickel and cobalt $Ni_x Co_{1-x}$, with $0.6 \leq x < 1$, a mixture of nickel and titanium $Ni_x Ti_{1-x}$, with $0.5 \leq x < 1$, chromium, nickel, copper, and mixtures thereof.

Preferably, B is selected from the group $G_B''$ (2) consisting of a mixture of chromium and iron $Cr_x Fe_{1-x}$ with $0.8 \leq x < 1$, a mixture of chromium and manganese $Cr_x Mn_{1-x}$, with $0.8 \leq x < 1$, a mixture of chromium and cobalt $Cr_x Co_{1-x}$, with $0.8 \leq x < 1$, a mixture of chromium and nickel $Cr_x Ni_{1-x}$, with $0.8 \leq x < 1$, a mixture of chromium and titanium $Cr_x Ti_{1-x}$, with $0.8 \leq x < 1$, a mixture of chromium and copper $Cr_x Cu_{1-x}$, with $0.8 \leq x < 1$, a mixture of nickel and iron $Ni_x Fe_{1-x}$, with $0.8 \leq x < 1$, a mixture of nickel and manganese $Ni_x Mn_{1-x}$, with $0.6 \leq x < 1$, a mixture of nickel and cobalt $Ni_x Co_{1-x}$, with $0.8 \leq x < 1$, a mixture of nickel and titanium $Ni_x Ti_{1-x}$, with $0.8 \leq x < 1$, a mixture of chromium and cobalt and iron $Cr_x Co_y Fe_z$, with x in the range 0.5 to 0.7, y in the range 0.2 to 0.4 and z in the range 0.1 to 0.3 and x+y+z=1, a mixture of chromium and cobalt and iron and manganese $Cr_x Co_y Fe_z Mn_t$, with x in the range 0.5 to 0.6, y in the range 0.2 to 0.3, z in the range 0.1 to 0.3 and t in the range 0.1 to 0.3 and x+y+z+t=1, a mixture of chromium and iron and manganese $Cr_x Fe_y Mn_z$, with x in the range 0.6 to 0.8, y in the range 0.1 to 0.3 and z in the range 0.1 to 0.4 and x+y+z=1, a mixture of nickel and cobalt and chromium $Ni_x Co_y Cr_z$, with x in the range 0.5 to 0.8, y in the range 0.1 to 0.4 and z in the range 0.1 to 0.4 and x+y+z=1, a mixture of nickel and cobalt and chromium and manganese $Ni_x Co_y Cr_z Mn_t$, with x in the range 0.5 to 0.7, y in the range 0.1 to 0.3, z in the range 0.1 to 0.3 and t in the range 0.1 to 0.3 and x+y+z+t=1, a mixture of nickel and chromium and manganese $Ni_x Cr_y Mn_z$, with x in the range 0.5 to 0.8, y in the range 0.1 to 0.4 and z in the range 0.1 to 0.4 and x+y+z=1, chromium, nickel, copper.

More preferably, 13 is selected from the group $G_B'''$ (3) consisting of a mixture of a mixture of chromium and cobalt $Cr_x Co_{1-x}$, with $0.8 \leq x < 1$, a mixture of chromium and nickel $Cr_x Ni_{1-x}$, with $0.8 \leq x < 1$, a mixture of nickel and cobalt $Ni_x Co_{1-x}$, with $0.8 \leq x < 1$, a mixture of chromium and cobalt and iron $Cr_x Co_y Fe_z$, with x in the range 0.5 to 0.7, y in the range 0.2 to 0.4 and z in the range 0.1 to 0.3 and x+y+z=1, a mixture of nickel and cobalt and chromium $Ni_x Co_y Cr_z$, with x in the range 0.5 to 0.8, y in the range 0.1 to 0.4 and z in the range 0.1 to 0.4 and x+y+z=1, a mixture of nickel and cobalt and chromium and manganese $Ni_x Co_y Cr_z Mn_t$, with x in the range 0.5 to 0.7, y in the range 0.1 to 0.3, z in the range 0.1 to 0.3 and t in the range 0.1 to 0.3 and x+y+z+t=1, chromium, nickel.

(R7): When the color dark green is sought for the sintered part to be manufactured, a particulate mixture in accordance with the invention may in particular comprise a quantity of powder of oxide(s) with a perovskite structure and/or of precursor(s) of said oxides that is greater than 3%, preferably greater than 4%, preferably greater than 5% and/or less than 6%, A and B preferably being selected from the groups $G_A'''$ and $G_B'''$ (1) to (3) above. In particular, a particulate mixture in accordance with the invention may comprise a quantity of a powder of oxide(s) with a perovskite structure and/or of precursor(s) of said oxides that is:

greater than 3% and less than 4% when the B-element is $Cr_x Fe_{1-x}$, with x in the range 0.6 to 0.7;

greater than 3% and preferably less than 6% when the B-element is $Cr_x Fe_{1-x}$, with $0.7 \leq x < 1$;

greater than 3% and less than 4% when the B-element is $Cr_x Mn_{1-x}$, with x in the range 0.6 to 0.7;

greater than 3% and less than 6% when the B-element is $Cr_x Mn_{1-x}$, with $0.7 \leq x < 1$, preferably greater than 3% and less than 5% when the B-element is $Cr_x Co_{1-x}$, with x in the range 0.7 to 0.8;

greater than 3% and less than 4% when the B-element is $Cr_x Co_{1-x}$, with x in the range 0.6 to 0.7;

greater than 3% and preferably less than 6% when the B-element is $Cr_x Co_{1-x}$, with $0.8 \leq x < 1$;

greater than 3% and less than 4% when the B-element is $Cr_x Ni_{1-x}$, with x in the range 0.6 to 0.7;

greater than 3% and preferably less than 6% when the B-element is $Cr_x Ni_{1-x}$, with $0.7 \leq x < 1$;

greater than 3% and less than 4% when the B-element is $Ni_x Fe_{1-x}$, with x in the range 0.6 to 0.7;

greater than 3% and less than 6% when the B-element is $Ni_x Mn_{1-x}$, with $0.7 \leq x < 1$, preferably greater than 3% and less than 4% when the B-element is $Ni_x Mn_{1-x}$, with x in the range 0.6 to 0.7;

greater than 3% and preferably less than 6% when the B-element is $Ni_x Mn_{1-x}$, with $0.7 \leq x < 1$;

greater than 3% and less than 5% when the B-element is $Ni_x Cr_{1-x}$, with x in the range 0.7 to 0.8;

greater than 3% and less than 4% when the B-element is $Ni_x Cr_{1-x}$, with x in the range 0.6 to 0.7;

greater than 3% and preferably less than 6% when the B-element is $Ni_x Cr_{1-x}$ with $0.8 \leq x < 1$.

(R8): When the color light green is sought for the sintered part to be manufactured, a particulate mixture in accordance with the invention may in particular comprise a quantity of powder of oxide(s) with a perovskite structure and/or of precursor(s) of said oxides that is less than 3%, preferably less than 2%, preferably less than 1.5%, A and B preferably being selected from the groups $G_A'''$ and W''' (1) to (3) above.

(R9): When the color yellow is sought for the sintered part to be manufactured, A and B may be selected as follows:

A may be selected from the group $G_A^{4t}$ (1) consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A^{4t}$ (2) consisting of calcium (Ca), strontium (Sr), barium (Ba), lanthanum (La), praseodymium (Pr), bismuth (Bi), cerium (Ce), and mixtures thereof.

More preferably, A is selected from the group $G_A^{4t}$ (3) consisting of lanthanum (La), praseodymium (Pr), bismuth (Bi), cerium (Ce), and mixtures thereof.

B may be selected from the group $G_B^{4'}$ (1) consisting of a mixture of magnesium and iron $Mg_x Fe_{1-x}$, with $0.8 \leq x < 1$ and only if A is selected from praseodymium (Pr), bismuth (Bi), cerium (Ce), and mixtures thereof, a mixture of titanium and iron $Ti_x Fe_{1-x}$, with $0.8 \leq x < 1$ and only if A is selected from praseodymium (Pr), bismuth (Bi), cerium (Ce), and mixtures thereof, tungsten, vanadium and molybdenum, and mixtures thereof.

Preferably, B is selected from the group $G_B^{4'}$ (2) consisting of a mixture of titanium and iron $Ti_x Fe_{1-x}$, with $0.8 \leq x < 1$ and only if A is selected from praseodymium (Pr), bismuth (Si), cerium (Ce), and mixtures thereof, tungsten, vanadium and molybdenum.

(R10): When the color yellow, is sought for the sintered part to be manufactured, a particulate mixture in accordance with the invention may in particular comprise a quantity of powder of oxide(s) with a perovskite structure and/or of precursor(s) of said oxides that is greater than 3%, preferably greater than 4%, and/or less than 6%, A and B preferably being selected from the groups $G_A^{4'}$ (1) to (3) and $G_B^{4'}$ (1) to (2) above.

(R11): When the color orange is sought for the sintered part to be manufactured, A and B may be selected as follows:

A may be selected from the group $G_A^{5'}$ (1) consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A^{5'}$ (2) consisting of a mixture of calcium and lanthanum, a mixture of strontium and lanthanum, calcium (Ca), strontium (Sr), barium (Ba), lanthanum (La), praseodymium (Pr), bismuth (Bi), cerium (Ce), and mixtures thereof.

More preferably, A is selected from the group $G_A^{5'}$ (3) consisting of lanthanum (La), praseodymium (Pr), bismuth (Bi), cerium (Ce), and mixtures thereof. Preferably, A is lanthanum (La).

B may be selected from the group $G_B^{5'}$ (1) consisting of a mixture of magnesium and iron $Mg_x Fe_{1-x}$, with $0 < x \leq 0.5$, a mixture of titanium and iron $Ti_x Fe_{1-x}$, with $0 < x \leq 0.5$, a mixture of niobium and iron $Nb_x Fe_{1-x}$, with $0 < x \leq 0.5$, a mixture of chromium and iron. $Cr_x Fe_{1-x}$, with $0 < x \leq 0.4$, a mixture of nickel and iron $Ni_x Fe_{1-x}$, with $0 < x \leq 0.4$, a mixture of manganese and iron $Mn_x Fe_{1-x}$, with $0 < x \leq 0.4$, iron, and mixtures thereof.

Preferably, B is selected from the group $G_B^{5'}$ (2) consisting of a mixture of magnesium and iron $Mg_x Fe_{1-x}$, with $0 < x \leq 0.2$, a mixture of titanium and iron $Ti_x Fe_{1-x}$, with $0 < x \leq 0.2$, a mixture of niobium and iron $Nb_x Fe_{1-x}$, with $0 < x \leq 0.2$, a mixture of chromium and iron. $Cr_x Fe_{1-x}$, with $0 < x \leq 0.4$, a mixture of manganese and iron $Mn_x Fe_{1-x}$, with $0 < x \leq 0.4$, a mixture of chromium and manganese and iron $Cr_x Mn_y Fe_z$; with x in the range 0.1 to 0.4, y in the range 0.1 to 0.4 and z in the range 0.5 to 0.8 and $x+y+z=1$, and iron.

More preferably, B is selected from the group $G_B^{5'}$ (3) consisting of a mixture of magnesium and iron $Mg_x Fe_{1-x}$, with $0 < x \leq 0.2$, a mixture of titanium and iron $Ti_x Fe_{1-x}$, with $0 < x \leq 0.2$, a mixture of chromium and iron $Cr_x Fe_{1-x}$, with $0 < x \leq 0.4$, a mixture of manganese and iron $Mn_x Fe_{1-x}$, with $0 < x \leq 0.4$, a mixture of chromium and manganese and iron $Cr_x Mn_y Fe_z$, with x in the range 0.1 to 0.4, y in the range 0.1 to 0.4 and z in the range 0.5 to 0.8 and $x+y+z=1$, and iron.

(R12): When the color light orange is sought for the sintered part to be manufactured, a particulate mixture in accordance with the invention may in particular comprise a quantity of powder of oxide(s) with a perovskite structure and/or of precursor(s) of said oxides that is less than 3%, preferably less than 2%, preferably less than 1.5%, A and B preferably being selected from the groups $G_A^{5'}$ and $G_B^{5'}$ (1) to (3) above.

(R13): When the color dark brown is sought for the sintered part to be manufactured, A and B may be selected as follows:

A may be selected from the group $G_A^{6'}$ (1) consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A^{6'}$ (2) consisting of a mixture of calcium and lanthanum, a mixture of strontium and lanthanum, lanthanum, and mixtures thereof.

More preferably, A is selected from the group $G_A^{6'}$ (3) consisting of lanthanum.

B may be selected from the group $G_B^{6'}$ (1) consisting of a mixture of chromium and iron $Cr_x Fe_{1-x}$, with $0 < x \leq 0.4$, a mixture of nickel and iron $Ni_x Fe_{1-x}$, with $0 < x \leq 0.4$, a mixture of manganese and iron $Mn_x Fe_{1-x}$, with $0 < x \leq 0.4$, and mixtures thereof.

Preferably, B is selected from the group $G_B^{6'}$ (2) consisting of a mixture of chromium and iron $Cr_x Fe_{1-x}$, with $0 < x \leq 0.4$, a mixture of manganese and iron $Mn_x Fe_{1-x}$, with $0 < x \leq 0.4$, a mixture of chromium and manganese and iron $Cr_x Mn_y Fe_z$, with x in the range 0.1 to 0.4, y in the range 0.1 to 0.4, and z in the range 0.5 to 0.8 and $x+y+z=1$.

(R14): When the color dark brown is sought for the sintered part to be manufactured, a particulate mixture in accordance with the invention may in particular comprise a quantity of powder of oxide(s) with a perovskite structure and/or of precursor(s) of said oxides that is greater than 3%, preferably greater than 4%, preferably greater than 5% and/or less than 6%, A and B preferably being selected from the groups $G_A^{6'}$ (1) to (3) and $G_B^{6'}$ (1) to (2) above. In particular, a particulate mixture in accordance with the invention may comprise a quantity of a powder of oxide(s) with a perovskite structure and/or of precursor(s) of said oxides that is:

greater than 3% and less than 4% when the B-element is $Cr_x Fe_{1-x}$, with x in the range 0.3 to 0.4;

greater than 3% and preferably less than 6% when the B-element is $Cr_x Fe_{1-x}$, with $0 < x \leq 0.3$;

greater than 3% and less than 4% when the B-element is $Mn_x Fe_{1-x}$, with x in the range 0.3 to 0.4;

greater than 3% and preferably less than 6% when the B-element is $Mn_x Fe_{1-x}$, with $0 < x \leq 0.3$.

(R15): When the color red is sought for the sintered part to be manufactured, A and B may be selected as follows:

A may be selected from the group $G_A^{7'}$ (1) consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A^{7'}$ (2) consisting of calcium (Ca), strontium (Sr), barium (Ba), lanthanum (La), praseodymium (Pr), bismuth (Bi), cerium (Ce), and mixtures thereof.

More preferably, A is selected from the group $G_A^{7'}$ (3) consisting of lanthanum (La), praseodymium (Pr), bismuth (Bi), cerium (Ce), and mixtures thereof. Preferably, A is lanthanum (La).

B may be selected from the group $G_1^{7'}$ (1) consisting of a mixture of magnesium and iron $Mg_x Fe_{1-x}$, with $0 < x \leq 0.5$, a mixture of titanium and iron $Ti_x Fe_{1-x}$, with $0 < x \leq 0.5$, a mixture of niobium and iron $Nb_x Fe_{1-x}$, with $0 < x \leq 0.5$, iron, and mixtures thereof.

Preferably, B is selected from the group $G_B^{7'}$ (2) consisting of a mixture of magnesium and iron $Mg_x Fe_{1-x}$, with $0 < x \leq 0.2$, a mixture of titanium and iron $Ti_x Fe_{1-x}$, with $0 < x \leq 0.2$, and iron. Preferably, B is iron.

(R16): When the color red is sought for the sintered part to be manufactured, a particulate mixture in accordance with the invention may in particular comprise a quantity of powder of oxide(s) with a perovskite structure and/or of precursor(s) of said oxides that is greater than 3%, preferably greater than 4% and/or preferably less than 6%, A and B preferably being selected from the groups $G_A^{7'}$ (1) to (3) and $G_B^{7'}$ (1) to (2) above.

(R17): When the color violet is sought for the sintered part to be manufactured, A and B may be selected as follows:

A may be selected from the group $G_A^{8'}$ (1) consisting of calcium (Ca), strontium (Sr), barium (Ba), lanthanum (La), praseodymium (Pr), neodymium (Nd), bismuth (Bi), cerium (Ce), and mixtures thereof.

Preferably, A is selected from the group $G_A^{8'}$ (2) consisting of lanthanum (La), praseodymium (Pr), neodymium (Nd), cerium (Ce), and mixtures thereof.

More preferably, A is selected from the group $G_A^{8'}$ (3) consisting of lanthanum (La), neodymium (Nd), and mixtures thereof.

B may be a mixture of cobalt and iron $Co_x Fe_{1-x}$, with $0<x\leq0.4$.

(R18): When the color dark violet is sought for the sintered part to be manufactured, a particulate mixture in accordance with the invention may in particular comprise a quantity of powder of oxide(s) with a perovskite structure and/or of precursor(s) of said oxides that is greater than 3%, preferably greater than 4% and/or preferably less than 6%, with A preferably being selected from the groups $G_A^{8'}$ (1) to (3) above and B being $Co_x Fe_{1-x}$, with $0<x<0.4$. In particular, a particulate mixture in accordance with the invention may comprise a quantity of a powder of oxide(s) with a perovskite structure and/or of precursor(s) of said oxides that is:

greater than 3% and less than 4% when the B-element is $Co_x Fe_{1-x}$, with x in the range 0.3 to 0.4;

greater than 3% and less than 5% when the B-element is $Co_x Fe_{1-x}$, with x in the range 0.2 to 0.3;

greater than 3% and preferably less than 6% when the B-element is $Co_x Fe_{1-x}$, with $0<x\leq0.2$.

The ranges defined above in order to characterize the various colors may be partially superimposed in order to accommodate hues that are difficult to classify without ambiguity. As an example, a "gray-blue" hue may be considered to be a blue color or a gray color.

The invention also provides an assembly comprising a particulate mixture in accordance with the invention and a notice, for example in the form of a label applied to packaging for the particulate mixture or a booklet accompanying the particulate mixture, the notice indicating that the particulate mixture is intended for the manufacture of decorative sintered parts.

As an example, the notice may carry the indication "powder for decorative ceramic" or "powder for colored ceramic".

The packaging may, for example, be a bag, for example of the "big bag" type, a can, or a drum.

The invention also provides a method of manufacturing a sintered part comprising the following steps:

a) mixing raw materials in order to form a starting charge;
b) shaping a preform from said starting charge; and
c) sintering said preform so as to obtain said sintered part, remarkable in that the starting charge comprises a particulate mixture in accordance with the invention.

In one implementation, the starting charge contains particles in which zirconia, which may optionally be stabilized, and stabilizer and/or sintering additive are intimately mixed.

The term "zirconia powder" is used below to describe the assembly of particles the major constituent by weight of which is zirconia.

In step c), the preform is sintered, preferably in air, preferably at atmospheric pressure or under pressure (Hot Pressing or Hot Isostatic Pressing, HIP) and at a temperature in the range 1200° C. to 1500° C., preferably greater than 1300° C. and/or less than 1450° C.

The invention also provides a method of manufacturing a sintered part comprising at least 70% zirconia, as a percentage by weight based on the oxides, and having a predetermined color;

said method comprising the following steps:
a') mixing raw materials in order to form a starting charge;
b') shaping a preform from said starting charge; and
c') sintering said preform so as to obtain said sintered part, and being remarkable in that a powder of oxide(s) with a perovskite structure is added to the starting charge, the quantity and the nature of said oxide(s) with a perovskite structure being determined as a function of said color, preferably following rules (R1) to (R18) and their variations defined above, the oxide(s) with a perovskite structure possibly being replaced, completely or in part, by an equivalent quantity of precursor(s) of said oxides.

Adapting the starting charge to satisfy these rules does not pose any particular problems.

Said method may in particular be carried out in order to manufacture a decorative article in accordance with the invention.

Steps a') to c') may in particular be steps a) to c), respectively, of a method of manufacturing a sintered part in accordance with the invention.

The invention also provides a method of darkening the color of a sintered part in accordance with the invention, in which method:

in the starting charge intended for the manufacture of said sintered part, the quantity of oxide(s) with a perovskite structure and/or of precursor(s) of said oxides is increased, said quantity preferably being greater than 3%, preferably greater than 4% and/or preferably less than 9%, preferably less than 6%; and/or a quantity of oxide(s) with a perovskite structure and/or of precursor(s) of said oxides is added to the starting charge intended for the manufacture of said sintered part, the A and B elements of said perovskite being selected from the groups $G_A'$ (1) to (3) and $G_B'$ (1) to (3) above, preferably in a quantity in the range 0.2% to 1%;

as percentages by weight based on the oxides of the starting charge.

The invention also provides a sintered part having the following chemical composition, as percentages by weight based on the oxides:

zirconia $ZrO_2$: complement to 100%;
0.5% to 10.0% of oxide(s) with a perovskite structure;
2.0% to 20.0% of a stabilizer for zirconia selected from the group consisting of $Y_2O_3$, $Sc_2O_3$, MgO, CaO, $CeO_2$, and mixtures thereof, the quantity MgO+CaO being less than 5.0%;
less than 2.0% of a sintering additive selected from the group consisting of $Al_2O_3$, ZnO, $TiO_2$, and mixtures thereof; and
less than 2.0% of other oxides.

In particular, the invention provides a sintered part obtained or capable of being obtained from a particulate mixture in accordance with the invention, in particular manufactured in accordance with a manufacturing method of the invention.

The inventors have discovered that such a sintered part has an appearance that is particularly suitable for use in a decorative article when the roughness Ra of its surface is less than 0.05 μm, preferably less than 0.02 μm, more preferably less than 0.01 μm, or is in the range 0.1 μm to 0.5 μm.

Preferably, the density of said sintered part is greater than 98%, preferably greater than 99%, preferably greater than 99.5% of the theoretical density. The inventors have discovered that a high density advantageously results in good color development in the sintered part and in good mechanical properties.

Preferably, more than 80%, preferably more than 90%, preferably more than 95% by volume of the zirconia of said sintered part is constituted by a quadratic and/or cubic phase, the complement to 100% being constituted by a monoclinic phase.

Preferably, the median size of the grains of zirconia is less than 2 μm, preferably less than 1 μm, or even less than 0.5 μm.

The oxide or oxides with a perovskite structure may be such that A and B belong to groups $G_A$ and $G_B$ (1) to (3), as described above.

A sintered part in accordance with the invention may in particular be black or even gray in color, by selecting A and B from the groups $G_A'$ and $G_B'$ (1) to (3), as described above.

In particular, it may have the following color parameters, measured in accordance with French standard NF ISO 7724:
  $L^*<50$ for the color gray, and if the color black is sought:
    $L^*<10$, preferably $L^*<5$, preferably $L^*<1$; and/or
  $|a^*|<5$, preferably $|a^*|<2$, preferably $|a^*|<1$, preferably $|a^*|<0.5$; and/or
  $|b^*|<5$, preferably $|b^*|<2$, preferably $|b^*|<1$, preferably $|b^*|<0.5$.

A sintered part in accordance with the invention may also have the color blue, especially by selecting A and B from the groups $G_A''$ and $G_B''$ (1) to (3), as described above.

In particular, it may have the following color parameters, measured in accordance with French standard NF ISO 7724:
  $10<L^*<30$, preferably $10<L^*<20$ for the color dark blue, and if the color light blue is sought: $30<L^*<70$, preferably $30<L^*<50$; and/or
  $a^*<5$, preferably $a^*<0$; and/or
  $b^*<-10$, preferably $b^*<-20$.

A sintered part in accordance with the invention may also have the color green, especially by selecting A and B from the groups $G_A'''$ and $G_B'''$ (1) to (3), as described above.

In particular, it may have the following color parameters, measured in accordance with French standard NF ISO 7724:
  $10<L^*<30$, preferably $10<L^*<20$ for the color dark green, and if the color light green is sought: $30<L^*<70$, preferably $30<L^*<50$; and/or
  $a^*<-5$, preferably $a^*<-10$; and/or
  $b^*>0$, preferably $b^*>20$.

A sintered part in accordance with the invention may also have the color yellow, especially by selecting A and B from the groups $G_A^{4'}$ (1) to (3) and $G_B^{4'}$ (1) to (2), as described above.

In particular, it may have the following color parameters, measured in accordance with French standard NF ISO 7724:
  $30<L^*<70$, preferably $30<^*<50$ for the color light yellow; and/or
  $|a^*|<5$; and/or
  $b^*>10$, preferably $b^*>20$.

A sintered part in accordance with the invention may also have the color orange, especially by selecting A and B from the groups $G_A^{5'}$ and $G_2^{5'}$ (1) to (3), as described above.

In particular, it may have the following color parameters, measured in accordance with French standard NF ISO 7724:
  $30<L^*<70$, preferably $30<L^*<50$ for the color light orange; and/or
  $a^*>5$, preferably $a^*>10$; and/or
  $b^*>10$, preferably $b^*>20$.

A sintered part in accordance with the invention may also have the color dark brown, especially by selecting A and B from the groups $G_A^{6'}$ (1) to (3) and $G_B^{6'}$ (1) to (2), as described above.

In particular, it may have the following color parameters, measured in accordance with French standard NF ISO 7724:
  $10<L^*<30$, preferably $10<L^*<20$; and/or
  $a^*>5$, preferably $a'^*>10$; and/or
  $b^*>10$, preferably $b^*>20$.

A sintered part in accordance with the invention may also have the color red, especially by selecting A and B from the groups $G_A^{7'}$ (1) to (3) and $G_5^{7'}$ (1) to (2), as described above.

In particular, it may have the following color parameters, measured in accordance with French standard NF ISO 7724:
  $30<L^*<70$, preferably $30<L^*<50$ for the color light red; and/or
  $a^*>5$, preferably $a^*>10$; and/or
  $|b^*|<10$, preferably $|b^*|<5$.

A sintered part in accordance with the invention may also have the color dark violet, especially by selecting A from the group $G_A^{6'}$ (1) to (3), B being a mixture of cobalt and iron $Co_x Fe_{1-x}$, with $0<x\leq0.4$, as described above.

In particular, it may have the following color parameters, measured in accordance with French standard NF ISO 7724:
  $10<L^*<30$, preferably $10<L^*<20$; and/or
  $a^*>5$, preferably $a^*>10$; and/or
  $b^*<-5$, preferably $b^*<-10$.

The composition of a sintered part in accordance with the invention may be identical to that of particulate mixture in accordance with the invention, not considering the temporary constituents, and in particular considering only the oxides. In particular, the sintered part may have the following optional features:
- Preferably, the sintered part comprises 0.5% to 10.0% of oxide(s) with a perovskite structure.
- The quantity of perovskite in the oxide(s) with a perovskite structure is greater than 90%, preferably greater than 95%, preferably greater than 99%, preferably substantially 100%.
- The quantity of oxide(s) with a perovskite structure is greater than 3%, preferably greater than 4% and/or less than 9%, preferably less than 6%.
- The stabilizer for zirconia is selected from the group consisting of $Y_2O_3$, $Sc_2O_3$, and mixtures thereof and the quantity of said stabilizer for zirconia is less than 8%, preferably less than 6.5%.
- The stabilizer for zirconia is selected from the group consisting of MgO, CaO, and mixtures thereof and the quantity of said stabilizer for zirconia is less than 4%.
- The stabilizer for zirconia is $CeO_2$ and the quantity of said stabilizer for zirconia is greater than 10% and less than 15%.
- The stabilizer for zirconia is selected from the group consisting of $Y_2O_3$, $CeO_2$, and mixtures thereof, and preferably satisfies the relationship $10\% \leq 3.Y_2O_3 + CeO_2 \leq 20\%$.
- The stabilizer is $Y_2O_3$.
- The quantity of $Y_2O_3$ is greater than 3%, preferably greater than 4% and/or less than 8%, preferably less than 6.5%.
- The quantity of sintering additive is greater than 0.1%, preferably greater than 0.2% and/or less than 1.5%, preferably less than 1%, preferably less than 0.5%.
- The sintering additive is $Al_2O_3$.
- The sintered part comprises a quantity of powder of oxide(s) with a perovskite structure that is greater than 3%, preferably greater than 4% and/or less than 6%, A and B preferably being selected from the groups $G_A'$ and $G_B'$ (1) to (3) above.

The sintered part comprises a quantity of powder of oxide(s) with a perovskite structure less than 3%, preferably less than 2%, or even less than 1.5%, A and B preferably being selected from the groups $G_A'$ and $G_B'$ (1) to (3), $G_A''$ and $G_B''$ (1) to (3), $G_A'''$ and $G_B'''$ (1) to (3), $G_A^{5'}$ and $G_B^{5'}$ (1) to (3) above.

The invention also provides an article selected from the group consisting of a jewelry item, a watch, a bracelet, a necklace, a ring, a brooch, a tie-pin, a purse, a telephone, a piece of furniture, a household utensil, for example a knife or scissors, a handle (in a vehicle, such as a door handle, a gearstick knob; in a living space, such as a door and/or window handle), a button (such as a shirt button), an actuating button (window opening, autoradio, etc.), a panel (vehicle dash, guitar, etc.), a visible part on consumer goods (such as computer or telephone push buttons, the casing of a computer, etc.), part of a spectacle frame, or even the entire frame, an item of crockery, a frame (photograph frame), said article comprising a sintered part in accordance with the invention.

For these articles in particular, a surface roughness Ra of less than 0.05 μm, preferably less than 0.02 μm, more preferably less than 0.01 μm, is considered to be particularly advantageous.

The invention also provides an article comprising a sintered part in accordance with the invention, said sintered part being at least partially exposed on said article except when dismantling.

In one embodiment, the sintered part does not substantially participate in the principal function of the article, i.e. said sintered part principally has a decorative function, or even a purely decorative function. In other words, the sintered part is selected principally as the result of an esthetic choice.

DEFINITIONS

The term "sintering" is used to consolidate a granular agglomerate by heat treatment at more than 1100° C., optionally with partial or complete fusion of certain of the constituents of said agglomerate (but not all of said constituents).

A perovskite crystallographic structure corresponds to a particular arrangement of elements in sites conventionally termed "A-sites" and "B-sites". The terms "A-elements" and "B-elements" are normally used for the elements disposed on the A-sites and B-sites respectively.

Of the compounds with a perovskite crystallographic structure, "oxides with a perovskite structure" can in particular be singled out. Said oxides comprise compounds with formula $ABO_3$. The A- and/or B-sites are not always occupied by A- and/or B-elements respectively.

As an example, a lanthanum-manganese (LM) oxide with a perovskite structure is a compound in which A is lanthanum and B is manganese. Its structure is conventionally defined by a formula of type $LaMnO_3$. Another example may be a lanthanum-cobalt-iron-manganese oxide with a perovskite structure where A is lanthanum and B is a mixture of cobalt, iron and manganese defined by a formula of the type $LaCo_xFe_yMn_zO_3$, with $x+y\ z=1$, x, y and z being the molar fractions of the elements cobalt, iron and manganese respectively.

The "quantity of perovskite" excluding impurities, as a %, is defined by the following formula (1):

$$T=100*(A_{PER})/(A_{PER}+A_{secondary\ phase}) \quad (1)$$

where $A_{PER}$ is the area measured on an X-ray diffraction diagram obtained using a D5000 diffractometer type instrument from the supplier BRUKER provided with a copper XRD tube, with no deconvolution treatment of the principal diffraction peak or of the principal diffraction multiplet of the oxides with a perovskite structure obtained;

$A_{secondary\ phase}$ is the area measured on the same diagram, with no deconvolution treatment, of the principal diffraction peak or principal diffraction multiplet of the secondary phase. The secondary phase is the phase having the largest area for the principal peak or multiplet, without considering the oxides with a perovskite structure. In other words, the $Mn_3O_4$ phase may be the secondary phase identified on the X-ray diffraction diagram.

A multiplet is the partial superimposition of several peaks. As an example, a multiplet composed of two peaks is a doublet, a multiplet composed of three peaks is a triplet.

In a chemical composition, the quantities of oxides refer to the overall quantities for each of the corresponding chemical elements, expressed in the form of the most stable oxide, as is conventional in the industry; thus, sub-oxides are included, and possibly also nitrides, oxynitrides, carbides, oxycarbides, carbonitrides, or even, metallic species of the elements mentioned above.

The term "impurities" means inevitable constituents necessarily introduced with the starting materials or resulting from reactions with said constituents. The impurities are not necessary constituents, but are merely tolerated. In particular, compounds belonging to the group consisting of oxides, nitrides, oxynitrides, carbides, oxycarbides, carbonitrides and metallic species of sodium and other alkalis are impurities. An example that may be mentioned is $Na_2O$. In contrast, hafnium oxide is not considered to be an impurity. A total quantity of impurities of less than 2% does not substantially modify the results obtained.

In a source of zirconia particles, $HfO_2$ cannot be dissociated chemically from $ZrO_2$. "$ZrO_2$" thus conventionally designates the total quantity of these two oxides. In the present invention, $HfO_2$ is not deliberately added to the starting charge. $HfO_2$ thus designates only traces of hafnium oxide, that oxide always being naturally present in sources of zirconia in quantities generally below 2%. For the purposes of clarity, then, the quantity of zirconia and traces of hafnium oxide interchangeably are designated by "$ZrO_2+HfO_2$" or "$ZrO_2$," or indeed by "zirconia content".

The term "stabilized zirconia" designates a zirconia stabilized with a stabilizer with more than 80%, or even more than 90%, or even more than 95% or even substantially 100% by volume being in the quadratic and/or cubic phase, the complement to 100% being constituted by a monoclinic phase. The quantity of stabilized zirconia is measured by X-ray diffraction. On a solid part, the measurement surface is polished, with the final polishing step being carried out with a diamond-containing preparation known as Mecaprex LD32-E 1 μm supplied by PRESI, after which the part undergoes a heat treatment at 1000° C. for 1 h [hour] and is cooled to ambient temperature. For a powder, the measurement is carried out directly on the powder without prior milling.

The term "precursor" is used for a product, a compound or an assembly of compounds that, during sintering in air, results in the formation of said product. In the particular circumstance of an oxide with a perovskite structure, a precursor of said oxide with a perovskite structure is a compound constituted by an intimate mixture of the oxides and/or oxide precursors composing said oxide with a perovskite structure. Such an intimate mixture may, for example, be obtained by co-precipitation or spray atomization. Preferably, the intimate mixture is consolidated by a heat treatment. As an example, if a lanthanum-cobalt-iron-manganese oxide with a perovskite structure is considered with formula $LaCo_xFe_yMn_zO_3$, with x+y+z=1, x, y and z being the molar fractions of the elements cobalt, iron and manganese, respectively, a precursor of said oxide with a perovskite structure is an intimate mixture of lanthanum Oxide, cobalt oxide, iron oxide and manganese oxide. Another possible precursor is an intimate mixture of precursors of said oxides, such as an intimate mixture of lanthanum nitrate, cobalt nitrate, iron nitrate and manganese nitrate.

A quantity of a precursor of a product is said to be "equivalent" to a quantity of said product when, during sintering, it results in said quantity of said product.

The term "temporary" means "can be eliminated from the preform during sintering".

The term "median size" of the grains of a sintered part is used for the dimension measured using the "Mean Linear Intercept" method described in ASTM method E1382.

The term "median size" of an assembly of particles, generally denoted $D_{50}$, is used for the size dividing the particles of this assembly into first and second populations that are equal in mass, said first and second populations comprising only particles with a size greater than, or respectively less than the median size.

The percentiles or "centiles" 10 ($D_{10}$) and 90 ($D_{90}$) are the particle sizes corresponding to the percentages, by weight, of 10% and 50% respectively on the cumulative granulometric distribution curve of the particle sizes of the powder, the particle sizes being classified in ascending order. As an example, 10% by weight of the particles of the powder have a size less than $D_{10}$ and 90% by weight of the particles have a size greater than $D_{10}$. The percentiles may be determined with the aid of a granulometric distribution produced using a laser granulometer.

The specific surface area is calculated using the BET (Brunauer Emmet Teller) method as described in the *Journal of American Chemical Society* 60 (1938), pp 309-316.

Unless otherwise stated, all of the percentages are percentages by weight based on the oxides.

In the groups $G_A(1)$ to (3), $G_B(1)$ to (3), $G_A'(1)$ to (3), $G_B'$, (1) to (3), $G_A''$ and $G_B''(1)$ to (3), $G_A'''$ and $G_B'''(1)$ to (3), $G_A^{4'}(1)$ to (3), $G_B^{4'}(1)$ to (2), $G_A^{5'}$ and $G_B^{5'}(1)$ to (3), $G_A^{6'}(1)$ to (3), $G_B^{6'}(1)$ to (2), $G_A^{7'}(1)$ to (3), $G_B^{7'}(1)$ to (2), $G_A^{8'}(1)$ to (3), the indices x, y, z, and t are molar fractions.

DETAILED DESCRIPTION

More than 95%, more than 98%, or even substantially 100% of a particulate mixture in accordance with the invention is preferably constituted by oxides.

Preferably, the particulate mixture has a specific surface area, calculated by the BET method, that is greater than 3 m²/g [square meter per gram], preferably greater than 5 m²/g and/or less than 30 m²/g, preferably less than 25 m²/g, preferably less than 20 m²/g.

More preferably, it has a median size of ($D_{50}$) that is less than 10 µm, or even less than 5 µm, or even less than 3 µm, or even less than 1 µm and/or preferably greater than 0.05 µm.

The particulate mixture may be in the dry form, i.e. be obtained directly by mixing suitable starting materials. It may also have undergone an additional step, for example a spray atomization step, in particular to improve the chemical homogeneity thereby.

The principal constituent of the particulate mixture is zirconia.

The median size of the zirconia is less than 10 µm, or even less than 5 µm, or even less than 3 µm, or even less than 1 µm and/or preferably greater than 0.05 µm.

In the sintered part, the zirconia must be stabilized. In the particulate mixture, the zirconia may thus, preferably, be stabilized with said stabilizer, preferably with $Y_2O_3$.

The stabilizer and/or a precursor of said stabilizer may also be incorporated, in part or completely, into the particulate mixture, in the form of a powder, i.e. in a form separate from the zirconia, so that during sintering, at least a portion of the zirconia is stabilized.

Preferably, the particulate mixture comprises a stabilizer for zirconia selected from the group consisting of $Y_2O_3$, $CeO_2$, and mixtures thereof. Preferably, the quantity of $Y_2O_3$, $CeO_2$ satisfies the relationship $10\% \leq 3.Y_2O_3 + CeO_2 \leq 20\%$.

Preferably, said stabilizer is $Y_2O_3$. The quantity $Y_2O_3$ may in particular be greater than 3%, preferably greater than 4% and/or less than 8%, preferably less than 6.5%.

The median size of the powdered stabilizer and/or of a precursor of such a stabilizer for zirconia is less than 1 µm, preferably less than 0.5 µm, more preferably less than 0.1 µm. The efficiency of the zirconia stabilizer is advantageously improved thereby during sintering.

In accordance with the invention, the particulate mixture comprises another one or more oxide(s) with a perovskite structure and/or precursor(s) of such oxides.

The particles of oxides with a perovskite structure of a particulate mixture in accordance with the invention may be obtained using different processes such as fusion, solid phase synthesis, salt pyrolysis, precipitation of hydroxides and calcining thereof, or sol-gel synthesis.

The inventors have discovered that if the particulate mixture comprises more than 10.0% by weight of oxide(s) with a perovskite structure and/or precursor(s) of said oxides, the mechanical properties, in particular toughness, of the sintered parts are degraded. Said degradation is a major problem, in particular when the sintered parts are intended for the manufacture of decorative articles such as watches, bracelets, brooches, tie-pins, necklaces, telephones, furniture or household utensils such as knives or scissors. Thus, it is important that the total quantity of oxide(s) with a perovskite structure and/or precursor(s) of said oxides does not exceed 10.0%.

A minimum quantity of 0.5% of oxide(s) with a perovskite structure and/or precursor(s) of said oxides in the particulate mixture is considered to be indispensable to obtaining a sintered part with good scratch and shock resistance, as well as a good appearance with well developed, homogeneous colors.

The powder constituted by particles of oxide(s) with a perovskite structure and/or precursor(s) of said oxides preferably has a median size of less than 5 µm, preferably less than 1 µm, preferably less than 0.5 µm. Advantageously, the efficiency of the oxide or oxides with a perovskite structure in the sintered part is improved thereby.

In one embodiment, the particulate mixture does not contain a sintering additive, nor does it contain a precursor of such an additive. However, the particulate mixture preferably contains a sintering additive and/or a precursor of such an additive. Advantageously, the presence of a sintering additive means that the sintering temperature can be reduced.

The total quantity of sintering additive and precursor of said additive may be more than 0.1%, more than 0.2%, and/or less than 1.5%, preferably less than 1.0%, preferably less than 0.5%.

The sintering additive is preferably selected from the group consisting of $Al_2O_3$, $TiO_2$, and mixtures thereof; preferably, the sintering additive is $Al_2O_3$.

The "other oxides" preferably represent less than 1.5%, preferably less than 1%, more preferably less than 0.5%, preferably less than 0.2%, preferably less than 0.1%, preferably less than 0.05%, preferably less than 0.01%.

The "other oxides" are preferably only impurities.

A particulate mixture in accordance with the invention may also comprise one or more deflocculating agent(s) and/or binder(s) and/or lubricants, preferably temporary, which are conventionally used in shaping methods of the manufacture of preforms for sintering, for example an acrylic resin, polyethylene glycol (PEG), or polyvinyl alcohol (PVA).

A sintered part in accordance with the invention may be manufactured from a particulate mixture of the invention using a method that conventionally comprises steps a) to c). Optionally, prior to step a), this method comprises a milling step in order to produce the granulometric characteristics necessary for good subsequent densification of the material. In particular, milling may be carried out so that each of the powders used in step a) or so that the particulate mixture of the assembly of said powders has a median size of ($D_{50}$) that is less than 1 μm.

In step a), a "ready to use" particulate mixture in accordance with the invention may be used. In a variation, all of the starting materials may be metered in at the moment the starting charge is prepared.

The starting charge may also comprise one or more deflocculating agent(s) and/or binder(s) and/or lubricants, preferably temporary, which are in conventional use in shaping methods of the manufacture of preforms for sintering, for example an acrylic resin, polyethylene glycol (PEG) or polyvinyl alcohol (PVA).

The mixture of starting materials may optionally be spray atomized before passing on to step b). Advantageously, spray atomization can be used to improve the chemical homogeneity of said mixture.

In step b), the mixture is then shaped, for example by cold isostatic pressing, in order to form blocks of the desired size.

Other techniques such as slip casting, uniaxial pressing, gel casting, vibro-casting, injection molding or a combination of these techniques could be used.

In step c), the preform is sintered, preferably in air, at atmospheric pressure or under pressure (hot pressing, or hot isostatic pressing (HIP)), at a temperature in the range 120.0° C. to 1500° C., preferably in the range 1300° C. to 1450° C. Advantageously, sintering in this temperature range promotes good color development. The time over which this temperature is held is preferably in the range 2 h to 8 h. The temperature ramp-up is conventionally in the range 10° C./h to 100° C./h. The temperature ramp-down may be free. If the deflocculating agent(s) and/or binder(s) and/or lubricants are used, the sintering cycle preferably comprises a constant stage of 1 h to 4 h at a temperature in the range 400° C. to 800° C. in order to promote elimination of said products.

The parameters of the manufacturing method, in particular the granulometry of the particles in the starting charge, the sintering additive, the compression in order to manufacture the preform and the sintering temperature, may be adapted, in known manner, to adapt the density of the sintered part to the envisaged application.

The sintered part obtained at the end of step c) may be machined and/or may undergo a surface treatment, such as polishing or sanding, using any technique known to the skilled person.

EXAMPLES

The following examples are provided for the purposes of non-limiting illustration.

The chemical analyses were carried out by X-ray fluorescence as regards the constituents in a quantity of more than 0.5%. The quantity of the constituents present in a quantity of less than 0.5% was determined by AES-ICP ("Atomic Emission Spectroscopy-Inductively Coupled Plasma").

The specific surface area was measured by nitrogen adsorption at 77K and calculated using the 1 point BET method. The samples were pre-treated at 300° C. in a stream of nitrogen for 2 h before analysis.

The crystalline phases in the powders and in the sintered parts were determined by X-ray diffraction using a BRUKER D5000 instrument (with an adjustment for 2θ from 5° to 80°, in 0.02° steps and 1 second per step).

Prior to the measurement, the sintered zirconia parts were polished, the last polishing step having been carried out with a diamond-containing Mecaprex LD32-E1 μpreparation supplied by PRESI, then heat treated at 1000° C. for 1 h and cooled to ambient temperature.

The granulometric distributions were determined by sedigraphy using a Sedigraph 5100 instrument from the supplier Micromeritics®, after dispersing a suspension of the powders to be characterized in the presence of sodium metaphosphate using ultrasound.

An EDS ("Energy Dispersive Spectroscopy") analysis could also be carried out to identify the nature of the oxides with a perovskite structure present in a particulate mixture, as well as in the sintered part.

The median size of the grains of a sintered part was measured using a "Mean Linear Intercept" method in accordance with ASTM standard E1382. In that standard, analysis lines are traced on images of said sintered part, then the lengths, termed "intercepts", between two consecutive grain boundaries cutting said analysis line are measured along each analysis line. Next, the mean length "l'" of the intercepts "l" is measured. For the tests below, the intercepts were measured on images, obtained by scanning electron microscopy, of sections of the sintered part, said sections having been polished to obtain a mirror quality then attacked thermally at a temperature of less than 100° C. at the sintering temperature to reveal the grain boundaries. The magnification used to record the images was selected in order to be able to view approximately 500 grains on one image. Five images were produced per sintered part.

The average size "d" of the grains of a sintered part is given by the relationship: d=1.56·l'. This formula comes from the article "Average Grain Size in Polycrystalline Ceramics" M. I. Mendelson, J. Am. Cerm. Soc. Vol. 52, No. 8, pp 443-446.

The color measurements were carried out in accordance with NF standard ISO 7724 on polished parts wherein the last polishing step was carried out using a diamond-containing Mecaprex LD32-E 1 μm preparation supplied by PRESI, using a CM-2500d instrument supplied by Konica Minolta, with illuminant D65 (natural light), observer at 10°, and specular reflection excluded.

The hardness and toughness of the tested sintered parts were measured by Vickers indentation using polished sintered parts, the last polishing step having been carried out with a 1 μm diamond-containing paste.

The bending strength was measured at ambient temperature by 3 point bending on bars machined to dimensions of 45 mm×4 mm×3 mm.

The following non-limiting examples are given with the aim of illustrating the invention.

The powders of the various oxides with a perovskite structure used in the examples were prepared by solid phase reaction of the various salts, nitrates or chlorides co-precipitated in a basic medium with ammonia. The salts used, supplied by Sigma Aldrich, were hydrated lanthanum nitrate $La(NO_3)_3$, $xH_2O$, hexahydrated strontium chloride $SrCl_2$, $6H_2O$, hydrated manganese nitrate $Mn(NO_3)_2$, $xH_2O$, hexahydrated cobalt nitrate, $Co(NO_3)_2$, $6H_2O$, nonahydrated iron nitrate $Fe(NO_3)_3 \cdot 9H_2O$, hexahydrated chromium chloride $CrCl_3$, $6H_2O$, hexahydrated praseodymium nitrate $Pr(NO_3)$, $6H_2O$, and titanium chloride, $TiCl_4$. The salts were dissolved in distilled water at a total concentration of 1 mole/L [mole per liter]. The masses of the various salts are shown in Table 1 below:

TABLE 1

|  | $(La_{0.8}Sr_{0.2})MnO_3$ | $La(Co_{0.5}Fe_{0.5})O_3$ | $La(Co_{0.1}Fe_{0.1}Mn_{0.8})O_3$ | $La(Co_{0.2}Fe_{0.2}Mn_{0.6})O_3$ |
|---|---|---|---|---|
| Distilled water | Complement to 500 mL | Complement to 500 mL | Complement to 500 mL | Complement to 500 mL |
| $La(NO_3)_3$, $xH_2O$ | 65 g | 80 g | 80 g | 80 g |
| $Mn(NO_3)_2$, $xH_2O$ | 62 g | — | 50 g | 50 g |
| $SrCl_2$, $6H_2O$ | 13 g | — | — | — |
| $Co(NO_3)_2$, $6H_2O$ | — | 35 g | 6 g | 14.5 g |
| $Fe(NO_3)_3$, $9H_2O$ | — | 48.5 g | 8 g | 20 g |

|  | $La(Co_{0.9}Cr_{0.1})O_3$ | $LaCoO_3$ | $La(Co_{0.95}Co_{0.05})O_3$ | $La(Cr_{0.9}Co_{0.1})O_3$ |
|---|---|---|---|---|
| Distilled water | Complement to 500 mL | Complement to 500 mL | Complement to 500 mL | Complement to 500 mL |
| $La(NO_3)_3$, $xH_2O$ | 80 g | 80 g | 80 g | 80 g |
| $Co(NO_3)_2$, $6H_2O$ | 63 g | 70 g | 67 g | 7 g |
| $CrCl_3$, $6H_2O$ | 6.4 g | — | 3.2 g | 58 g |

|  | $La(Co_{0.6}Cr_{0.4})O_3$ | $Pr(Ti_{0.8}Fe_{0.2})O_3$ | $LaFeO_3$ | $La(Fe_{0.7}Cr_{0.3})O_3$ |
|---|---|---|---|---|
| Distilled water | Complement to 500 mL | Complement to 500 mL | Complement to 500 mL | Complement to 500 mL |
| $La(NO_3)_3$, $xH_2O$ | 80 g | — | 80 g | 80 g |
| $Co(NO_3)_2$, $6H_2O$ | 42 g | — | — | — |
| $CrCl_3$, $6H_2O$ | 25.5 g | — | — | 19.2 g |
| $Fe(NO_3)_3$, $9H_2O$ | — | 15 g | 97 g | 68 g |
| $Pr(NO_3)_3$, $6H_2O$ | — | 80 g | — | — |
| $TiCl_4$ | — | 28 g | — | — |

|  | $La(Fe_{0.9}Co_{0.1})O_3$ |
|---|---|
| Distilled water | Complement to 500 mL |
| $La(NO_3)_3$, $xH_2O$ | 80 g |
| $Co(NO_3)_2$, $6H_2O$ | 7 g |
| $Fe(NO_3)_3$, $9H_2O$ | 87 g |

The ammonia was added steadily, with stirring, until the pH reached 9. The precipitate obtained was then filtered through a Buchner funnel. The precipitates were oven dried for at least 12 h at 110° C. The powders obtained thereby were heat treated in air at a temperature allowing the formation of the perovskite phase, in general in the range 1000° C. to 1400° C. (a lower temperature would have been possible but would have resulted in a perovskite precursor). Here the temperature was 1300° C. After heat treatment, the percentage perovskite measured by X-ray diffraction on each of the powders was greater than 97.5%.

The quantity of the phase with a perovskite structure was determined using the method described above in the present description. By way of example, the determination of the quantity of lanthanum-strontium-manganese oxide perovskite $(La_{0.8}Sr_{0.2})MnO_3$ was carried out from the X-ray diffraction diagrams, acquired with a D5000 diffractometer from the supplier BRUKER provided with a copper XRD tube. After synthesis, the products obtained could include the perovskite phase, as well as other phases in smaller quantities, such as $Mn_3O_4$.

The perovskite phases of the lanthanum-strontium-manganese oxides were identified, using a conventional protocol, by X-ray diffraction using ICDD ("International Center for Diffraction Data") files. As an example, the file ICDD 01-040-1100 is that of the lanthanum-strontium-manganese oxide perovskite phase $La_{0.8}Sr_{0.2}MnO_3$.

In practice, measurements of the quantity of perovskite in the lanthanum-strontium-manganese oxides were carried out when the X-ray diffraction diagram exhibited:
  a lanthanum-strontium-manganese oxide perovskite phase in the majority;
  a secondary phase and possibly other minor phases.

Thus, using EVA software (Supplied by BRUKER) and after subtracting the continuous background (0.8), it is possible to measure the area $A_{PER}$ (with no deconvolution treatment) of the principal diffraction peak or principal diffraction multiplet for the perovskite phase of the lanthanum-strontium-manganese oxide and the area $A_{secondary\ phase}$ (no deconvolution treatment) of the principal diffraction peak or principal diffraction multiplet of the secondary phase (here $Mn_3O_4$). The quantity of lanthanum-strontium-manganese oxide perovskite is then calculated using formula (1).

Thus, if the lanthanum-strontium-manganese oxide perovskite phase (LSM) is the only phase present in the X-ray diffraction diagram, the percentage of perovskite is equal to 100%. Here the quantity of $La_{0.8}Sr_{0.2}MnO_3$ perovskite calculated using formula (1) was 97.9%.

For each of the examples, the powdered oxide with a perovskite structure was mixed with a zirconia powder with the principal characteristics shown in Table 2, by micro-milling zirconia powder with the powdered oxide with a perovskite structure. The alumina in this zirconia powder advantageously acts as a sintering additive.

TABLE 2

|  | Zirconia powder, containing yttrium |
|---|---|
| $ZrO_2$ (% by weight) | Complement to 100% |
| $Y_2O_3$ (% by weight) | 5.38 |
| $Al_2O_3$ parts per million (ppm) | 2500 |
| $SiO_2$ (ppm) | 100 |
| $Na_2O$ (ppm) | 140 |
| CaO (ppm) | 70 |
| $Fe_2O_3$ (ppm) | 80 |
| MgO (ppm) | <20 |
| $TiO_2$ (ppm) | <20 |
| Specific surface area ($m^2/g$) | 13 |
| $d_{10}$ (μm) | 0.2 |
| $d_{50}$ (μm) | 0.6 |
| $d_{90}$ (μm) | 1.5 |

Said micro-milling was carried out in a wet bead mill (zirconia beads containing 3 molar % of $Y_2O_3$, with a diameter of 0.8 mm [millimeter]) or attrition mill. The milling conditions used for each mixture were as follows:

Volume of mill: 800 mL [millimiter];
Mass of beads: 2.2 kg [kilogram];
Volume of demineralized water: 200 mL;
Mass of powder in micro-mill: 50 g [gram].

After micro-milling, the powders had a median size, measured by sedigraphy, of 0.25 μm.

The various suspensions were then dried by spray atomization, with an atomizer inlet temperature of 300° C. and an atomizer outlet temperature of 110° C., the flow rate of the suspension being 6 L/h [liter per hour]. The powders obtained thereby were then screened through a 250 μm sieve.

The various particulate mixtures produced are shown in Table 3 below:

TABLE 3

|  | Zirconia powder containing yttrium as in Table 2 (%) | Powder of oxide with a perovskite structure (%) | Nature of oxide with a perovskite structure |
|---|---|---|---|
| Example 1 | 96 | 4 | $(La_{0.8}Sr_{0.2})MnO_3$ |
| Example 2 | 94 | 6 | $(La_{0.8}Sr_{0.2})MnO_3$ |
| Example 3 | 90 | 10 | $(La_{0.8}Sr_{0.2})MnO_3$ |
| Example 4 | 99 | 1 | $(La_{0.8}Sr_{0.2})MnO_3$ |
| Example 5 | 96 | 4 | $La(Co_{0.5}Fe_{0.5})O_3$ |
| Example 6 | 96 | 4 | $La(Co_{0.1}Fe_{0.1}Mn_{0.8})O_3$ |
| Example 7 | 96 | 4 | $La(Co_{0.2}Fe_{0.2}Mn_{0.6})O_3$ |
| Example 8 | 96 | 4 | $La(Co_{0.9}Cr_{0.1})O_3$ |
| Example 9 | 96 | 4 | $LaCoO_3$ |
| Example 10 | 99 | 1 | $La(Co_{0.95}Co_{0.05})O_3$ |
| Example 11 | 96 | 4 | $La(Cr_{0.9}Co_{0.1})O_3$ |
| Example 12 | 98 | 2 | $La(Cr_{0.9}Co_{0.1})O_3$ |
| Example 13 | 98 | 2 | $La(Co_{0.6}Cr_{0.4})O_3$ |
| Example 14 | 96 | 4 | $Pr(Ti_{0.8}Fe_{0.2})O_3$ |
| Example 15 | 99 | 1 | $LaFeO_3$ |
| Example 16 | 96 | 4 | $La(Fe_{0.7}Cr_{0.3})O_3$ |
| Example 17 | 99 | 1 | $La(Fe_{0.7}Mn_{0.3})O_3$ |
| Example 18 | 96 | 4 | $LaFeO_3$ |
| Example 19 | 96 | 4 | $La(Fe_{0.9}Co_{0.1})O_3$ |

Preforms, in the shape of pellets with a diameter of 32 mm and a mass of 8 g, were produced by uniaxial pressing at a pressure of 100 MPa, of the particulate mixtures of the examples. Said preforms were then sintered using the following cycle:

temperature ramp-up to 500° C. at 100° C./h;
hold at 500° C. for 2 h;
temperature ramp-up to 1350° C., at 100° C./h [degree Celcius per hour];
hold at 1350° C. for 2 h;
temperature ramp-down by natural cooling.

Table 4 below summarizes the properties of the sintered parts obtained.

TABLE 4

| Particulate mixture of example | Density ($g/cm^3$) | Toughness ($MPa \cdot m^{1/2}$) | Hardness (HV10) | L* | a* | b* | Color |
|---|---|---|---|---|---|---|---|
| 1 | 5.96 | 11 | 1340 | 0.3 | 0.2 | 0.1 | black |
| 2 | 5.94 | 9 | 1320 | 0.3 | 0.1 | 0.1 | black |
| 3 | 5.90 | 7 | 1300 | 0.2 | 0.0 | 0.1 | black |
| 4 | 6.00 | — | 1340 | 30 | 3 | 4 | gray |
| 5 | 5.96 | 10 | 1350 | 0.4 | 0.2 | −0.15 | black |
| 6 | 5.96 | 12 | 1350 | 0.1 | 0.0 | 0.1 | black |
| 7 | 5.97 | 11 | 1380 | 0.2 | 0.1 | 0.1 | black |
| 8 | 5.98 | 12 | 1340 | 20 | −18 | −23 | dark blue |
| 9 | 5.97 | 11 | 1320 | 24 | −5 | −30 | dark blue |
| 10 | 6.0 | 13 | 1350 | 38 | −7 | −27 | light blue |
| 11 | 5.98 | — | — | 20 | −15 | 20 | dark green |
| 12 | 5.99 | — | — | 40 | −10 | 20 | light green |
| 13 | 6.0 | 13 | 1350 | 40 | −10 | −5 | gray |
| 14 | 5.96 | 7 | 1280 | 65 | −2 | 20 | yellow |
| 15 | 6.01 | 9 | 1300 | 65 | 15 | 30 | orange |
| 16 | 5.97 | 10 | 1320 | 19 | 12 | 32 | dark brown |
| 17 | 6.0 | 9 | 1350 | 44 | 5 | 19 | orange |
| 18 | 5.98 | — | — | 45 | 13 | 1.3 | red |
| 19 | 5.98 | — | — | 20 | 10 | −5 | violet |

More than 95% by volume of the zirconia of the sintered parts obtained from the particulate mixtures 1 to 7 was constituted by a quadratic and/or cubic phase, the complement to 100% being constituted by a monoclinic phase.

Table 4 shows that the sintered parts of the invention that were tested had good mechanical properties and were dense.

A comparison of Examples 1 to 3 shows a reduction in the mechanical properties, in particular toughness, when the quantity of perovskite $(La_{0.8}Sr_{0.2})MnO_3$ increased. When the quantity of oxide with a perovskite structure was more than 10.0%, the mechanical properties Were considered to be insufficient for the envisaged applications.

The sintered parts of the invention are particularly suitable for use as a decorative adornment in articles such as watches, bracelets, brooches, tie-pins, necklaces, telephones, furniture, or household utensils such as knives or scissors.

Clearly, the present invention is not limited to the embodiments described and provided by way of examples.

The invention claimed is:

1. A decorative article selected from the group consisting of a jewelry item, a watch, a bracelet, a necklace, a ring, a brooch, a tie-pin, a purse, a telephone, a piece of furniture, a household utensil, a handle, a button, a panel, a part of a spectacle frame, an item of crockery, and a frame, said article comprising a sintered part obtained from a particulate mixture having a chemical composition comprising, as percentages by weight based on the oxides:
- zirconia $ZrO_2$: complement to 100%;
- 0.5% to 10.0% of oxide(s) with a perovskite structure;
- 2.0% to 20.0% of a stabilizer for zirconia selected from the group consisting of $Y_2O_3$, $Sc_2O_3$, MgO, CaO, $CeO_2$, and mixtures thereof, a quantity MgO+CaO being less than 5.0%;
- less than 2.0% of a sintering additive selected from the group consisting of $Al_2O_3$, ZnO, $TiO_2$, and mixtures thereof; and
- less than 2.0% of other oxides;

wherein:
- the oxide(s) with a perovskite structure and/or said stabilizer and/or said sintering additive are optionally replaced, completely or in part, by an equivalent quantity of precursor(s) of said oxides; and
- the stabilizer for zirconia comprises at least $Y_2O_3$ in an amount greater than 2% and less than 8%.

2. A decorative article comprising a sintered part obtained from a particulate mixture having a chemical composition comprising, as percentages by weight based on the oxides:
- zirconia $ZrO_2$: complement to 100%;
- 0.5% to 10.0% of oxide(s) with a perovskite structure;
- 2.0% to 20.0% of a stabilizer for zirconia selected from the group consisting of $Y_2O_3$, $Sc_2O_3$, MgO, CaO, $CeO_2$, and mixtures thereof, a quantity MgO+CaO being less than 5.0%;
- less than 2.0% of a sintering additive selected from the group consisting of $Al_2O_3$, ZnO, $TiO_2$, and mixtures thereof; and
- less than 2.0% of other oxides;

wherein:
- the oxide(s) with a perovskite structure and/or said stabilizer and/or said sintering additive are optionally replaced, completely or in part, by an equivalent quantity of precursor(s) of said oxides; and
- the stabilizer for zirconia comprises at least $Y_2O_3$ in an amount greater than 2% and less than 8%.

3. The article according to claim 2, having a surface of roughness Ra that is less than 0.05 μm, or is in a range of from 0.1 μm to 0.5 μm.

4. The article according to claim 2, said mixture comprising 0.5% to 10.0%, as a percentage by weight based on the oxides, of an oxide with a perovskite structure and/or a precursor of said oxide wherein:
- an A-element at an A-site of the perovskite structure of said oxide is selected from the group $G_A(1)$ consisting of calcium, strontium, barium, lanthanum, praseodymium, neodymium, bismuth, cerium, and mixtures thereof; and
- a B-element at a B-site of the perovskite structure of said oxide is selected from the group $G_B(1)$ consisting of a mixture of cobalt and iron, a mixture of cobalt and manganese, a mixture of cobalt and chromium, a mixture of cobalt and nickel, a mixture of chromium and manganese, a mixture of chromium and nickel, a mixture of chromium and iron, a mixture of manganese and iron, a mixture of manganese and nickel, a mixture of nickel and iron, manganese, a mixture of cobalt and titanium, a mixture of cobalt and copper, cobalt, a mixture of chromium and titanium, a mixture of chromium and copper, a mixture of nickel and titanium, chromium, nickel, copper, a mixture of magnesium and iron, a mixture of titanium and iron, vanadium, tungsten, molybdenum, a mixture of niobium and iron, iron, and mixtures thereof.

5. The article according to claim 4, wherein
- the A-element at the A-site of the perovskite structure is selected from the group $G_A(2)$ consisting of a mixture of calcium and lanthanum, a mixture of strontium and lanthanum, calcium, strontium, barium, lanthanum, praseodymium, neodymium, bismuth, cerium, and mixtures thereof; and/or
- the B-element at the B-site of the perovskite structure is selected from the group $G_B(2)$ consisting of a mixture of cobalt and iron, a mixture of cobalt and manganese, a mixture of chromium and manganese, a mixture of chromium and iron, a mixture of manganese and iron, a mixture of cobalt and chromium and iron, a mixture of cobalt and chromium and iron and manganese, a mixture of cobalt and iron and manganese, manganese, a mixture of cobalt and chromium, a mixture of cobalt and nickel, a mixture of cobalt and titanium, a mixture of cobalt and copper, cobalt, a mixture of chromium and nickel, a mixture of chromium and titanium, a mixture of chromium and copper, a mixture of nickel and iron, a mixture of nickel and manganese, a mixture of nickel and cobalt, a mixture of nickel and titanium, a mixture of nickel and cobalt and chromium, a mixture of nickel and cobalt and chromium and manganese, a mixture of nickel and chromium and manganese, chromium, nickel, copper, a mixture of titanium and iron, vanadium, tungsten, molybdenum, a mixture of magnesium and iron, a mixture of niobium and iron, iron, a mixture of chromium and manganese and iron.

6. The article according to claim 5, wherein:
- the A-element at the A-site of the perovskite structure is selected from the group $G_A(3)$ consisting of lanthanum, praseodymium, bismuth, cerium, neodymium, and mixtures thereof; and/or
- the B-element at the B-site of the perovskite structure is selected from the group $G_B(3)$ consisting of a mixture of cobalt and chromium and iron, a mixture of cobalt and chromium and iron and manganese, a mixture of cobalt and iron and manganese, manganese, a mixture of cobalt and chromium, cobalt, a mixture of chromium and nickel, a mixture of nickel and cobalt, a mixture of nickel and cobalt and chromium, a mixture of nickel and cobalt and chromium and manganese, chromium, nickel, a mixture of magnesium and iron, a mixture of titanium and iron, iron, a mixture of chromium and iron, a mixture of manganese and iron, a mixture of chromium and manganese and iron.

7. The article according to claim 2, wherein an A-element at an A-site of the perovskite structure is lanthanum.

8. The article according to claim 4, wherein:
- the A-element at the A-site of the perovskite structure is selected from the group $G_A'(1)$ consisting of calcium, strontium, barium, lanthanum, praseodymium, neodymium, bismuth, cerium, and mixtures thereof; and
- the B-element at the B-site of the perovskite structure is selected from the group $G_B'(1)$ consisting of a mixture of cobalt and iron $Co_x Fe_{1-x}$, with x in a range of from 0.2 to 0.8, a mixture of cobalt and manganese $Co_x Mn_{1-x}$, with x in a range of from 0.2 to 0.8, a mixture of cobalt and chromium $Co_x Cr_{1-x}$, with x in a range of from 0.2 to 0.8, a mixture of cobalt and nickel $Co_x Ni_{1-x}$, with x in a range of from 0.3 to 0.8, a mixture of chromium and manganese $Cr_x Mn_{1-x}$, with x in a range of from 0.2 to 0.7, a mixture of chromium and nickel $Cr_x Ni_{1-x}$, with x in a range of from 0.3 to 0.7, a mixture of chromium and iron $Cr_x Fe_{1-x}$, with x in a range of from 0.3 to 0.7, a mixture of manganese and iron $Mn_x Fe_{1-x}$, with x in a range of from 0.3 to 0.8, a mixture of manganese and nickel $Mn_x Ni_{1-x}$, with x in a range of from 0.3 to 0.8, a mixture of nickel and iron $Ni_x Fe_{1-x}$, with x in a range of from 0.3 to 0.7, manganese, and mixtures thereof.

9. The article according to claim 8, wherein:
the A-element at the A-site of the perovskite structure is selected from the group $G_A'(2)$ consisting of a mixture of calcium and lanthanum, a mixture of strontium and lanthanum, lanthanum, and mixtures thereof; and/or
the B-element at the B-site of the perovskite structure is selected from the group $G_B'(2)$ consisting of a mixture of cobalt and iron $Co_x Fe_{1-x}$, with x in a range of from 0.4 to 0.7, a mixture of cobalt and manganese $Co_x Mn_{1-x}$, with x in a range of from 0.4 to 0.6, a mixture of chromium and manganese $Cr_x Mn_{1-x}$, with x in a range of from 0.3 to 0.6, a mixture of chromium and iron $Cr_x Fe_{1-x}$, with x in a range of from 0.4 to 0.6, a mixture of manganese and iron $Mn_x Fe_{1-x}$, with x in a range of from 0.4 to 0.6, a mixture of cobalt and chromium and iron $Co_x Cr_y Fe_y$, with x in a range of from 0.2 to 0.4, y in a range of from 0.2 to 0.4 and z in a range of from 0.2 to 0.4 and x+y+z=1, a mixture of cobalt and chromium and iron and manganese $Co_x Cr_y Fe_z Mn_t$, with x in a range of from 0.1 to 0.4, y in a range of from 0.1 to 0.4, z in a range of from 0.1 to 0.4 and t in a range of from 0.1 to 0.4 and x+y+z+t=1, a mixture of cobalt and iron and manganese $Co_x Fe_y Mn_z$, with x in a range of from 0.2 to 0.4, y in a range of from 0.3 to 0.5 and z in a range of from 0.2 to 0.4 and x+y+z=1, and manganese.

10. The article according to claim 9, wherein:
the A-element at the A-site of the perovskite structure is selected from the group $G_A'(3)$ consisting of lanthanum; and/or
the B-element at the B-site of the perovskite structure is selected from the group $G_B'(3)$ consisting of a mixture of cobalt and chromium and iron $Co_x Cr_y Fe_z$, with x in a range of from 0.2 to 0.4, y in a range of from 0.2 to 0.4 and z in a range of from 0.2 to 0.4 and x+y+z=1, a mixture of cobalt and chromium and iron and manganese $Co_x Cr_y Fe_z Mn_t$, with x in a range of from 0.1 to 0.4, y in a range of from 0.1 to 0.4, z in a range of from 0.1 to 0.4 and t in a range of from 0.1 to 0.4 and x+y+z+t=1, a mixture of cobalt and iron and manganese $Co_x Fe_y Mn_z$, with x in a range of from 0.2 to 0.4, y in a range of from 0.3 to 0.5 and z in a range of from 0.2 to 0.4 and x+y+z=1, and manganese.

11. The article according to claim 4, wherein:
the A-element at the A-site of the perovskite structure is selected from the group $G_A''(1)$ consisting of calcium (Ca), strontium (Sr), barium (Ba), lanthanum (La), praseodymium (Pr), neodymium (Nd), bismuth (Bi), cerium (Ce), and mixtures thereof; and
the B-element at the B-site of the perovskite structure is selected from the group $G_B''(1)$ consisting of a mixture of cobalt and iron $Co_x Fe_{1-x}$, with 0.6≤x<1, a mixture of cobalt and manganese $Co_x Mn_{1-x}$, with 0.6≤x<1, a mixture of cobalt and chromium $Co_x Cr_{1-x}$, with 0.6≤x<1, a mixture of cobalt and nickel $Co_x Ni_{1-x}$, with 0.6≤x<1, a mixture of cobalt and titanium $Co_x Ti_{1-x}$, with 0.5≤x<1, a mixture of cobalt and copper $Co_x Cu_{1-x}$, with 0.5≤x<1, cobalt, and mixtures thereof.

12. The article according to claim 11, wherein:
the A-element at the A-site of the perovskite structure is selected from the group $G_A''(2)$ consisting of a mixture of calcium and lanthanum, a mixture of strontium and lanthanum, lanthanum, and mixtures thereof; and/or
the B-element at the B-site of the perovskite structure is selected from the group $G_B''(2)$ consisting of a mixture of cobalt and iron $Co_x Fe_{1-x}$, with 0.8≤x<1, a mixture of cobalt and manganese $Co_x Mn_{1-x}$, with 0.8≤x<1, a mixture of cobalt and chromium $Co_x Cr_{1-x}$, with 0.8≤x<1, a mixture of cobalt and nickel $Co_x Ni_{1-x}$, with 0.8≤x<1, a mixture of cobalt and titanium $Co_x Ti_{1-x}$, with 0.8≤x<1, a mixture of cobalt and copper $Co_x Cu_{1-x}$, with 0.8≤x<1, a mixture of cobalt and chromium and iron $Co_x Cr_y Fe_z$, with x in a range of from 0.5 to 0.8, y in a range of from 0.1 to 0.4 and z in a range of from 0.1 to 0.4 and x+y+z=1, a mixture of cobalt and chromium and iron and manganese $Co_x Cr_y Fe_z Mn_t$, with x in a range of from 0.5 to 0.7, y in a range of from 0.1 to 0.3, z in a range of from 0.1 to 0.3 and t in a range of from 0.1 to 0.3 and x+y+z+t=1, a mixture of cobalt and iron and manganese $Co_x Fe_y Mn_z$, with x in a range of from 0.5 to 0.8, y in a range of from 0.1 to 0.4 and z in a range of from 0.1 to 0.4 and x+y+z=1, and cobalt.

13. The article according to claim 4, wherein:
the A-element at the A-site of the perovskite structure is selected from the group $G_A'''(1)$ consisting of calcium (Ca), strontium (Sr), barium (Ba), lanthanum (La), praseodymium (Pr), neodymium (Nd), bismuth (Bi), cerium (Ce), and mixtures thereof; and
the B-element at the B-site of the perovskite structure is selected from the group $G_B'''(1)$ consisting of a mixture of chromium and iron $Cr_x Fe_{1-x}$, with 0.6≤x<1, a mixture of chromium and manganese $Cr_x Mn_{1-x}$, with 0.6≤x<1, a mixture of chromium and cobalt $Cr_x Co_{1-x}$, with 0.6≤x<1, a mixture of chromium and nickel $Cr_x Ni_{1-x}$, with 0.6≤x<1, a mixture of chromium and titanium $Cr_x Ti_{1-x}$, with 0.5≤x<1, a mixture of chromium and copper $Cr_x Cu_{1-x}$, with 0.5≤x<1, a mixture of nickel and iron $Ni_x Fe_{1-x}$, with 0.6≤x<1, a mixture of nickel and manganese $Ni_x Mn_{1-x}$, with 0.6≤x<1, a mixture of nickel and cobalt $Ni_x Co_{1-x}$, with 0.6≤x<1, a mixture of nickel and titanium $Ni_x Ti_{1-x}$, with 0.5≤x<1, chromium, nickel, copper, and mixtures thereof.

14. The article according to claim 13, wherein:
the A-element at the A-site of the perovskite structure is selected from the group $G_A'''(2)$ consisting of a mixture of calcium and lanthanum, a mixture of strontium and lanthanum, lanthanum, and mixtures thereof; and/or
the B-element at the B-site of the perovskite structure is selected from the group $G_B'''(2)$ consisting of a mixture of chromium and iron $Cr_x Fe_{1-x}$, with 0.8≤x<1, a mixture of chromium and manganese $Cr_x Mn_{1-x}$, with 0.8≤x<1, a mixture of chromium and cobalt $Cr_x Co_{1-x}$, with 0.8≤x<1, a mixture of chromium and nickel $Cr_x Ni_{1-x}$, with 0.8≤x<1, a mixture of chromium and titanium $Cr_x Ti_{1-x}$, with 0.8≤x<1, a mixture of chromium and copper $Cr_x Cu_{1-x}$, with 0.8≤x<1, a mixture of nickel and iron $Ni_x Fe_{1-x}$, with 0.8≤x<1, a mixture of nickel and manganese $Ni_x Mn_{1-x}$, with 0.6≤x<1, a mixture of nickel and cobalt $Ni_x Co_{1-x}$, with 0.8≤x<1, a mixture of nickel and titanium $Ni_x Ti_{1-x}$, with 0.8≤x<1, a mixture of chromium and cobalt and iron $Cr_x Co_y Fe_z$, with x in a range of from 0.5 to 0.7, y in a range of from 0.2 to 0.4 and z in a range of from 0.1 to 0.3 and x+y+z=1, a mixture of chromium and cobalt and iron and manganese $Cr_x Co_y Fe_z Mn_t$, with x in a range of from 0.5 to 0.6, y in a range of from 0.2 to 0.3, z in a range of from 0.1 to 0.3 and t in a range of from 0.1 to 0.3 and x+y+z+t=1, a mixture of chromium and iron and manganese $Cr_x Fe_y Mn_z$, with x in a range of from 0.6 to 0.8, y in a range of from 0.1 to 0.3 and z in a range of from 0.1 to 0.4 and x+y+z=1, a mixture of nickel and cobalt and chromium $Ni_x Co_y Cr_y$, with x in a range of from 0.5 to 0.8, y in a range of from 0.1 to 0.4 and z in a range of from 0.1 to 0.4 and x+y+z=1, a mixture of nickel and cobalt and chromium and manganese $Ni_x Co_y Cr_z Mn_t$, with x in a range of from 0.5 to 0.7, y in a range of from 0.1 to 0.3, z in a range of from 0.1 to 0.3 and t in a range of from 0.1 to 0.3 and x+y+z+t=1, a mixture of nickel and chromium and manganese $Ni_x Cr_y Mn_z$, with x in a range of from 0.5 to 0.8, y in a range of from 0.1 to 0.4 and z in a range of from 0.1 to 0.4 and x+y+z=1, chromium, nickel, copper.

15. The article according to claim 4, wherein:
the A-element at the A-site of the perovskite structure is selected from the group $G_A^{4t}(1)$ consisting of calcium (Ca), strontium (Sr), barium (Ba), lanthanum (La), praseodymium (Pr), neodymium (Nd), bismuth (Bi), cerium (Ce), and mixtures thereof; and
the B-element at the B-site of the perovskite structure is selected from the group $G_B^{4t}(1)$ consisting of a mixture of magnesium and iron $Mg_x Fe_{1-x}$, with $0.8 \leq x < 1$ and only if A is selected from praseodymium (Pr), bismuth (Bi), cerium (Ce), and mixtures thereof, a mixture of titanium and iron $Ti_x Fe_{1-x}$, with $0.8 \leq x < 1$ and only if A is selected from praseodymium (Pr), bismuth (Bi), cerium (Ce), and mixtures thereof, tungsten, vanadium and molybdenum, and mixtures thereof.

16. The article according to claim 4, wherein:
the A-element at the A-site of the perovskite structure is selected from the group $G_A^{5t}(1)$ consisting of calcium (Ca), strontium (Sr), barium (Ba), lanthanum (La), praseodymium (Pr), neodymium (Nd), bismuth (Bi), cerium (Ce), and mixtures thereof; and
the B-element at the B-site of the perovskite structure is selected from the group $G_B^{5t}(1)$ consisting of a mixture of magnesium and iron $Mg_x Fe_{1-x}$, with $0 < x \leq 0.5$, a mixture of titanium and iron $Ti_x Fe_{1-x}$, with $0 < x \leq 0.5$, a mixture of niobium and iron $Nb_x Fe_{1-x}$, with $0 < x \leq 0.5$, a mixture of chromium and iron $Cr_x Fe_{1-x}$, with $0 < x \leq 0.4$, a mixture of nickel and iron $Ni_x Fe_{1-x}$, with $0 < x \leq 0.4$, a mixture of manganese and iron $Mn_x Fe_{1-x}$, with $0 < x \leq 0.4$, iron, and mixtures thereof.

17. The article according to claim 16, wherein:
the A-element at the A-site of the perovskite structure is selected from the group $G_A^{5t}(2)$ consisting of a mixture of calcium and lanthanum, a mixture of strontium and lanthanum, calcium (Ca), strontium (Sr), barium (Ba), lanthanum (La), praseodymium (Pr), bismuth (Bi), cerium (Ce), and mixtures thereof; and/or
the B-element at the B-site of the perovskite structure is selected from the group $G_B^{5t}(2)$ consisting of a mixture of magnesium and iron $Mg_x Fe_{1-x}$, with $0 < x \leq 0.2$, a mixture of titanium and iron $Ti_x Fe_{1-x}$, with $0 < x \leq 0.2$, a mixture of niobium and iron $Nb_x Fe_{1-x}$, with $0 < x \leq 0.2$, a mixture of chromium and iron $Cr_x Fe_{1-x}$, with $0 < x \leq 0.4$, a mixture of manganese and iron $Mn_x Fe_{1-x}$, with $0 < x \leq 0.4$, a mixture of chromium and manganese and iron $Cr_x Mn_y Fe_y$, with x in a range of from 0.1 to 0.4, y in a range of from 0.1 to 0.4 and z in a range of from 0.5 to 0.8 and x+y+z=1, and iron.

18. The article according to claim 4, wherein:
the A-element at the A-site of the perovskite structure is selected from the group $G_A^{6t}(1)$ consisting of calcium (Ca), strontium (Sr), barium (Ba), lanthanum (La), praseodymium (Pr), neodymium (Nd), bismuth (Bi), cerium (Ce), and mixtures thereof; and
the B-element at the B-site of the perovskite structure is selected from the group $G_B^{6t}(1)$ consisting of a mixture of chromium and iron $Cr_x Fe_{1-x}$, with $0 < x \leq 0.4$, a mixture of nickel and iron $Ni_x Fe_{1-x}$, with $0 < x \leq 0.4$, a mixture of manganese and iron $Mn_x Fe_{1-x}$, with $0 < x \leq 0.4$, and mixtures thereof.

19. The article according to claim 18, wherein:
the A-element at the A-site of the perovskite structure is selected from the group $G_A^{6t}(2)$ consisting of a mixture of calcium and lanthanum, a mixture of strontium and lanthanum, lanthanum, and mixtures thereof; and/or
the B-element at the B-site of the perovskite structure is selected from the group $G_B^{6t}(2)$ consisting of a mixture of chromium and iron $Cr_x Fe_{1-x}$, with $0 < x \leq 0.4$, a mixture of manganese and iron $Mn_x Fe_{1-x}$, with $0 < x \leq 0.4$, a mixture of chromium and manganese and iron $Cr_x Mn_y Fe_y$, with x in a range of from 0.1 to 0.4, y in a range of from 0.1 to 0.4 and z in a range of from 0.5 to 0.8 and x+y+z=1.

20. The article according to claim 4, wherein:
the A-element at the A-site of the perovskite structure is selected from the group $G_A^{7t}(1)$ consisting of calcium (Ca), strontium (Sr), barium (Ba), lanthanum (La), praseodymium (Pr), neodymium (Nd), bismuth (Bi), cerium (Ce), and mixtures thereof; and
the B-element at the B-site of the perovskite structure is selected from the group $G_B^{7t}(1)$ consisting of a mixture of magnesium and iron $Mg_x Fe_{1-x}$, with $0 < x \leq 0.5$, a mixture of titanium and iron $Ti_x Fe_{1-x}$, with $0 < x \leq 0.5$, a mixture of niobium and iron $Nb_x Fe_{1-x}$, with $0 < x \leq 0.5$, iron, and mixtures thereof.

21. The article according to claim 4, wherein:
the A-element at the A-site of the perovskite structure is selected from the group $G_A^{8t}(1)$ consisting of calcium (Ca), strontium (Sr), barium (Ba), lanthanum (La), praseodymium (Pr), neodymium (Nd), bismuth (Bi), cerium (Ce), and mixtures thereof; and
the B-element at the B-site of the perovskite structure is a mixture of cobalt and iron $Co_x Fe_{1-x}$, with $0 < x \leq 0.4$.

22. The article according to claim 2, said mixture comprising a quantity of powder of oxide(s) with a perovskite structure and/or of precursor(s) of said oxides that is greater than 3% and/or less than 6%, as percentages by weight based on the oxides.

23. The article according to claim 2, said mixture comprising a quantity of powder of oxide(s) with a perovskite structure and/or of precursor(s) of said oxides that is less than 3%, as a percentage by weight based on the oxides.

24. The article according to claim 2, wherein a quantity of perovskite in the 0.5% to 10% of oxide(s) with a perovskite structure and/or of precursor(s) of said oxides is greater than 90%, the quantity of perovskite excluding impurities, as a %, being defined by the following formula (1):

$$T = 100 * (A_{PER})/(A_{PER} + A_{secondary\,phase}) \quad (1)$$

where
$A_{PER}$ is an area measured on an X-ray diffraction diagram obtained using a D5000 diffractometer type instrument from the supplier BRUKER provided with a copper XRD tube, with no deconvolution treatment of a principal diffraction peak or of a principal diffraction multiplet of the oxides with a perovskite structure obtained;
$A_{secondary\,phase}$ is an area measured on the same diagram, with no deconvolution treatment, of a principal diffraction peak or principal diffraction multiplet of a secondary phase.

25. The article according to claim 2, wherein the stabilizer for zirconia is selected from the group consisting of $Y_2O_3$, $CeO_2$, and mixtures thereof.

26. The article according to claim 25, wherein $10\% \leq 3.Y_2O_3 + CeO_2 \leq 20\%$, $Y_2O_3$ and $CeO_2$ being expressed as percentages by weight based on the oxides.

27. The article according to claim 2, wherein the stabilizer for zirconia is $Y_2O_3$, a quantity of $Y_2O_3$ being greater than 3% by weight and less than 8% by weight.

28. The article according to claim 2, said mixture having a median size that is less than 10 μm.

29. The article according to claim 28, said mixture having a median size that is less than 1 μm.

30. The article according to claim 2, said sintered part having a density that is greater than 98% of a theoretical density.

31. The article according to claim 2, wherein more than 80% by volume of the zirconia is constituted by a quadratic and/or cubic phase, the complement to 100% being constituted by a monoclinic phase.

32. A method of manufacturing a decorative article according to claim 2, comprising the following steps of manufacturing said sintered part:
   a') mixing raw materials to form a starting charge;
   b') shaping a preform from said starting charge; and
   c') sintering said preform so as to obtain said sintered part;
   in which method the starting charge is determined so as to obtain, at the end of step c'), a sintered part with a color selected from the group consisting of black, blue, green, yellow, orange, dark brown, red, and violet.

33. A method according to claim 32 wherein, in order to darken the color of said sintered part:
   in the starting charge intended for the manufacture of said sintered part, a quantity of oxide(s) with a perovskite structure and/or of precursor(s) of said oxides is increased, said quantity being greater than 3% and less than 9%; and/or
   a quantity of oxide(s) with a perovskite structure and/or of precursor(s) of said oxides is added to the starting charge intended for the manufacture of said sintered part, wherein:
   an A-element at an A-site of the perovskite structure is selected from the group $G_A'(1)$ consisting of calcium, strontium, barium, lanthanum, praseodymium, neodymium, bismuth, cerium, and mixtures thereof; and
   a B-element at a B-site of the perovskite structure is selected from the group $G_B'(1)$ consisting of a mixture of cobalt and iron $Co_x Fe_{1-x}$, with x in a range of from 0.2 to 0.8, a mixture of cobalt and manganese $Co_x Mn_{1-x}$, with x in a range of from 0.2 to 0.8, a mixture of cobalt and chromium $Co_x Cr_{1-x}$, with x in a range of from 0.2 to 0.8, a mixture of cobalt and nickel $Co_x Ni_{1-x}$, with x in a range of from 0.3 to 0.8, a mixture of chromium and manganese $Cr_x Mn_{1-x}$, with x in a range of from 0.2 to 0.7, a mixture of chromium and nickel $Cr_x Ni_{1-x}$, with x in a range of from 0.3 to 0.7, a mixture of chromium and iron $Cr_x Fe_{1-x}$, with x in a range of from 0.3 to 0.7, a mixture of manganese and iron $Mn_x Fe_{1-x}$, with x in a range of from 0.3 to 0.8, a mixture of manganese and nickel $Mn_x Ni_{1-x}$, with x in a range of from 0.3 to 0.8, a mixture of nickel and iron $Ni_x Fe_{1-x}$, with x in a range of from 0.3 to 0.7, manganese, and mixtures thereof,
as percentages by weight based on the oxides of the starting charge.

34. A method according to claim 32, wherein a quantity of oxide(s) with a perovskite structure and/or precursors of said oxides that is less than 3%, as a percentage by weight on the basis of the oxides of the starting charge, is added to the starting charge intended for the manufacture of said sintered part.

35. A method according to claim 32, comprising incorporating said sintered part into a jewelry item, a watch, a bracelet, a necklace, a ring, a brooch, a tie-pin, a purse, a telephone, a piece of furniture and a household utensil, a button, a panel, a visible part on consumer goods, part of a spectacle frame, an item of crockery, or a frame.

36. An assembly comprising:
   a particulate mixture having a composition adapted to the manufacture, by sintering, of a sintered part of an article according to claim 2; and
   a notice indicating that the particulate mixture is intended for the manufacture of decorative sintered parts.

* * * * *